(12) United States Patent
Alfarhan et al.

(10) Patent No.: US 12,225,581 B2
(45) Date of Patent: Feb. 11, 2025

(54) CONSISTENT SIDELINK LISTEN BEFORE TALK FAILURE

(71) Applicant: InterDigital Patent Holdings, Inc., Wilmington, DE (US)

(72) Inventors: Faris Alfarhan, Montreal (CA); Martino M. Freda, Laval (CA); J. Patrick Tooher, Montreal (CA); Tao Deng, New York, NY (US); Tuong Duc Hoang, Montreal (CA); Moon-il Lee, Melville, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/653,605

(22) Filed: May 2, 2024

(65) Prior Publication Data
US 2024/0298350 A1 Sep. 5, 2024

Related U.S. Application Data

(63) Continuation of application No. PCT/US2022/048476, filed on Oct. 31, 2022.
(Continued)

(51) Int. Cl.
*H04W 74/0808* (2024.01)
*H04W 72/25* (2023.01)

(52) U.S. Cl.
CPC ....... *H04W 74/0808* (2013.01); *H04W 72/25* (2023.01)

(58) Field of Classification Search
CPC . H04W 72/20; H04W 72/25; H04W 74/0808; H04W 24/08; H04W 24/10;
(Continued)

(56) References Cited

U.S. PATENT DOCUMENTS

2021/0051525 A1* 2/2021 Cao ................. H04W 28/26
2021/0105104 A1* 4/2021 Cao ................. H04L 1/1819
(Continued)

FOREIGN PATENT DOCUMENTS

EP 3843475 A1 6/2021
EP 4027723 A1 7/2022
(Continued)

OTHER PUBLICATIONS

3rd Generation Partnership Project (3GPP), RP-182878, "New WID on NR-based Access to Unlicensed Spectrum", Qualcomm Inc., 3GPP TSG RAN Meeting #82, Sorrento, Italy, Dec. 10-13, 2018, 8 pages.
(Continued)

*Primary Examiner* — Thomas R Cairns
(74) *Attorney, Agent, or Firm* — Condo Roccia Koptiw LLP

(57) ABSTRACT

A wireless transmit/receive unit (WTRU) may perform a listen before talk (LBT) procedure associated with a sidelink (SL) bandwidth. The SL bandwidth may include a resource block (RB) set. The WTRU may determine a CSLF associated with the RB set of the SL bandwidth based on the LBT procedure. The WTRU may determine a resource for reporting the CSLF, for example, based on a priority rule. The priority rule may indicate that a licensed resource has a higher priority than an unlicensed resource. The priority rule may indicate that, if a consistent LBT failure is not detected on an unlicensed uplink (UL) resource, the unlicensed UL resource has a higher priority than an unlicensed SL resource. The WTRU may send a medium access control (MAC) control element (CE) using the determined resource. In examples, the MAC CE may indicate the RB set.

20 Claims, 6 Drawing Sheets

Related U.S. Application Data

(60) Provisional application No. 63/388,030, filed on Jul. 11, 2022, provisional application No. 63/275,354, filed on Nov. 3, 2021.

(58) Field of Classification Search
CPC .............. H04W 72/02; H04W 72/044; H04W 72/0457; H04W 72/40; H04W 72/53; H04W 76/14; H04W 76/23; H04W 92/18
See application file for complete search history.

(56) References Cited

U.S. PATENT DOCUMENTS

| | | | |
|---|---|---|---|
| 2021/0144761 A1* | 5/2021 | Chin | H04W 72/0453 |
| 2021/0144762 A1* | 5/2021 | Tsai | H04W 74/0833 |
| 2021/0336682 A1* | 10/2021 | Pezeshki | H04B 7/063 |
| 2024/0008077 A1* | 1/2024 | Han | H04W 74/0816 |

FOREIGN PATENT DOCUMENTS

| | | |
|---|---|---|
| WO | 2021/062823 A1 | 4/2021 |
| WO | 2021/215679 A1 | 10/2021 |

OTHER PUBLICATIONS

3rd Generation Partnership Project (3GPP), TR 21.916 V2.0.0, "Technical Specification Group Services and System Aspects, Release 16 Description, Summary of Rel-16 Work Items (Release 16)", CP-211309, Jun. 2021, 157 pages.

3rd Generation Partnership Project (3GPP), TR 38.889 V16.0.0, "Technical Specification Group Radio Access Network, Study on NR-based Access to Unlicensed Spectrum, (Release 16)", Dec. 2018, pp. 1-119.

3rd Generation Partnership Project (3GPP), TR 38.825 V16.0.0, Technical Specification Group Radio Access Network, Study on NR Industrial Internet of Things (IoT), (Release 16), Mar. 2019, pp. 1-33.

3rd Generation Partnership Project (3GPP), TS 36.213 V16.0.0, Technical Specification Group Radio Access Network, Evolved Universal Terrestrial Radio Access (E-UTRA), Physical layer procedures (Release 16), Dec. 2019, pp. 1-568.

3rd Generation Partnership Project (3GPP), TS 36.321 V16.5.0, "Technical Specification Group Radio Access Network, Evolved Universal Terrestrial Radio Access (E-UTRA), Medium Access Control (MAC) protocol specification (Release 16)", Jun. 2021, pp. 1-143.

3rd Generation Partnership Project (3GPP), TS 36.331 V16.6.0, "Technical Specification Group Radio Access Network, Evolved Universal Terrestrial Radio Access (E-UTRA), Radio Resource Control (RRC), Protocol Specification (Release 16)", Sep. 2021, pp. 1-1091.

3rd Generation Partnership Project (3GPP), TS 38.213 V16.2.0, "Technical Specification Group Radio Access Network, NR, Physical Layer Procedures for Control (Release 16)", Jun. 2020, pp. 1-175.

3rd Generation Partnership Project (3GPP), TS 38.214 V16.2.0, "Technical Specification Group Radio Access Network, NR, Physical layer procedures for data (Release 16)", Jun. 2020, pp. 1-163.

3rd Generation Partnership Project (3GPP), TS 38.321 V16.6.0, "Technical Specification Group Radio Access Network, NR, Medium Access Control (MAC) Protocol Specification (Release 16)", Sep. 2021, pp. 1-158.

3rd Generation Partnership Project (3GPP), TS 38.331 V16.2.0, "Technical Specification Group Radio Access Network, NR, Radio Resource Control (RRC) Protocol Specification (Release 16)", Sep. 2020, pp. 1-921.

3rd Generation Partnership Project (3GPP), R2-1910688, "Consistent LBT Failure Detection and Recovery", Google, 3GPP TSG-RAN WG2 Meeting#107, Prague, Czech Republic, Aug. 26-30, 2019, 5 pages.

3rd Generation Partnership Project (3GPP), R2-2005970, "Corrections to 5G V2X with NR Sidelink", RAN2, 3GPP TSG-RAN WG2 Meeting #110-e, Online, Jun. 1-12, 2020, 43 pages.

3rd Generation Partnership Project (3GPP), RP-202846, "WID Revision: NR Sidelink Enhancement", LG Electronics, 3GPP TSG RAN Meeting #90e, Electronic Meeting, Dec. 7-11, 2020, 6 pages.

3rd Generation Partnership Project (3GPP), TR 22.842 V17.1.0, "Technical Specification Group Services and System Aspects, Study on Network Controlled Interactive Services, (Release 17)", Sep. 2019, pp. 1-29.

3rd Generation Partnership Project (3GPP), TR 22.886 V16.2.0, "Technical Specification Group Services and System Aspects, Study on Enhancement of 3GPP Support for 5G V2X Services (Release 16)", Dec. 2018, pp. 1-76.

3rd Generation Partnership Project (3GPP), TS 22.186 V16.2.0, "Technical Specification Group Services and System Aspects, Enhancement of 3GPP support for V2X scenarios, Stage 1, (Release 16)", Jun. 2019, pp. 1-18.

3rd Generation Partnership Project (3GPP), TS 23.287 V16.5.0, "Technical Specification Group Services and System Aspects, Architecture Enhancements for 5G System (5GS) to Support Vehicle-to-Everything (V2X) Services, (Release 16)", Dec. 2020, pp. 1-58.

3rd Generation Partnership Project (3GPP), TS 36.300 V16.6.0, "Technical Specification Group Radio Access Network, Evolved Universal Terrestrial Radio Access (E-UTRA) and Evolved Universal Terrestrial Radio Access Network (E-UTRAN), Overall description, Stage 2, (Release 16)", Jun. 2021, pp. 1-391.

3rd Generation Partnership Project (3GPP), TS 37.213 V16.6.0, "Technical Specification Group Radio Access Network, Physical Layer Procedures for Shared Spectrum Channel Access (Release 16)", Jun. 2021, pp. 1-27.

3rd Generation Partnership Project (3GPP), TS 38.321 V16.3.0, "Technical Specification Group Radio Access Network, NR, Medium Access Control (MAC) Protocol Specification, (Release 16)", Dec. 2020, pp. 1-156.

3rd Generation Partnership Project (3GPP), TS 38.331 V16.3.1, "Technical Specification Group Radio Access Network, NR, Radio Resource Control (RRC) Protocol Specification, (Release 16)", Jan. 2021, pp. 1-932.

\* cited by examiner

CONSISTENT SIDELINK LISTEN BEFORE TALK FAILURE

CROSS-REFERENCE TO RELATED APPLICATIONS

This application filed under 35 U.S.C. § 111 is a continuation of and claims the benefit, under 35 U.S.C. § 365, of Patent Cooperation Treaty Application No. PCT/US2022/048476, filed Oct. 31, 2022, which claims the benefit of Provisional U.S. Patent Application No. 63/275,354, filed Nov. 3, 2021, and Provisional U.S. Patent Application No. 63/388,030, filed Jul. 11, 2022, the disclosure of which is incorporated herein by reference in their entireties.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth-generation (4G) long-term evolution (LTE). Wireless communication devices may establish communications with other devices and data networks, e.g., via an access network, such as a radio access network (RAN).

SUMMARY

Systems, methods, and instrumentalities are disclosed herein for handling consistent sidelink (SL) listen-before-talk (LBT) failures (CSLF). A wireless transmit/receive unit (WTRU) may perform a listen before talk (LBT) procedure associated with a sidelink (SL) bandwidth. The SL bandwidth may include a resource block (RB) set. The WTRU may determine a CSLF associated with the RB set of the SL bandwidth based on the LBT procedure. The WTRU may determine a resource for reporting the CSLF, for example, based on a priority rule. The priority rule may indicate that a licensed resource has a higher priority than an unlicensed resource. The priority rule may indicate that, if a consistent LBT failure is not detected on an unlicensed uplink (UL) resource, the unlicensed UL resource has a higher priority than an unlicensed SL resource. The WTRU may send a medium access control (MAC) control element (CE) using the determined resource. In examples, the MAC CE may indicate the RB set and/or an identification of a WTRU associated with the SL bandwidth.

The priority rule may indicate that if a CSLF is not detected on a first unlicensed SL resource, and a CSLF is detected on a second unlicensed SL resource, the first unlicensed SL resource has a higher priority than the second unlicensed SL resource. The priority rule may indicate that, if a consistent LBT failure is detected on an unlicensed UL resource, and a CSLF is not detected on a unlicensed SL resource, the unlicensed UL resource has a lower priority for CSLF reporting than the unlicensed SL resource.

A WTRU may switch from a first RB set to a second RB set based on a determination of one or more LBT failures on the first RB set. The WTRU may detect a CSLF on the first RB set, for example, by performing a first LBT procedure including at least one LBT attempt for a transmission of a TB. The WTRU may determine the second RB set based on the detection of the CSLF associated with the first RB set. In examples, the WTRU may perform a second LBT procedure associated with the second RB set. The WTRU may determine that the second LBT procedure is successful or that a number of LBT failures associated with the second RB set is less than a value. The WTRU may determine the TB associated with the first RB set and transmit the TB using the second RB set. In some examples, the WTRU may transmit the TB associated with the first RB using the second RB set based on SL control information (SCI) associated with the second RB set being received from another WTRU associated with the second RB set. The first RB set and the second RB set may be associated with a same data resource pool or associated with different data resource pools.

A WTRU may determine a CSLF associated with an RB set (e.g., the first RB set) based on a number of SL LBT failures associated with the RB set, for example, when the number of SL LBT failures associated with the RB set is equal to or greater than a value. For example, the WTRU may increment the number of SL LBT failures associated with the RB set if the WTRU determines that SCI has not been received, within a time, from another WTRU associated with the RB set. The WTRU may increment the number of SL LBT failures associated with the RB set if the WTRU determines that a channel busy ratio (CBR) associated with the RB set is equal to or greater than a value. In examples, an LBT procedure may include a determination of whether the SCI is received from another WTRU associated with the RB set or a determination of the CBR associated with the RB set. The WTRU may increment the number of SL LBT failures associated with the RB set based on a LBT procedure.

A WTRU may indicate an SL LBT failure to a base station. The WTRU may perform an LBT procedure including one or more LBT attempts. The WTRU may determine that an LBT attempt on an RB set has been unsuccessful. The WTRU may determine an SL LBT failure associated with the RB set based on the unsuccessful LBT attempt on the RB set. The WTRU may send an indication of the SL LBT failure to the base station, for example, using an MAC CE or using a negative acknowledgement for a physical uplink control channel (PUCCH) transmission from the base station.

A WTRU may perform multiple LBT attempts on respective RB sets of configured RB sets. The WTRU may receive configuration information indicating multiple RB sets. The WTRU may perform a respective LBT attempt on an RB set of the configured RB sets. The WTRU may determine an LBT attempt on an RB set of the configured RB sets is successful. The WTRU may transmit a TB using the RB set associated with the successful LBT attempt.

DETAILED DESCRIPTION

Figure 1A:
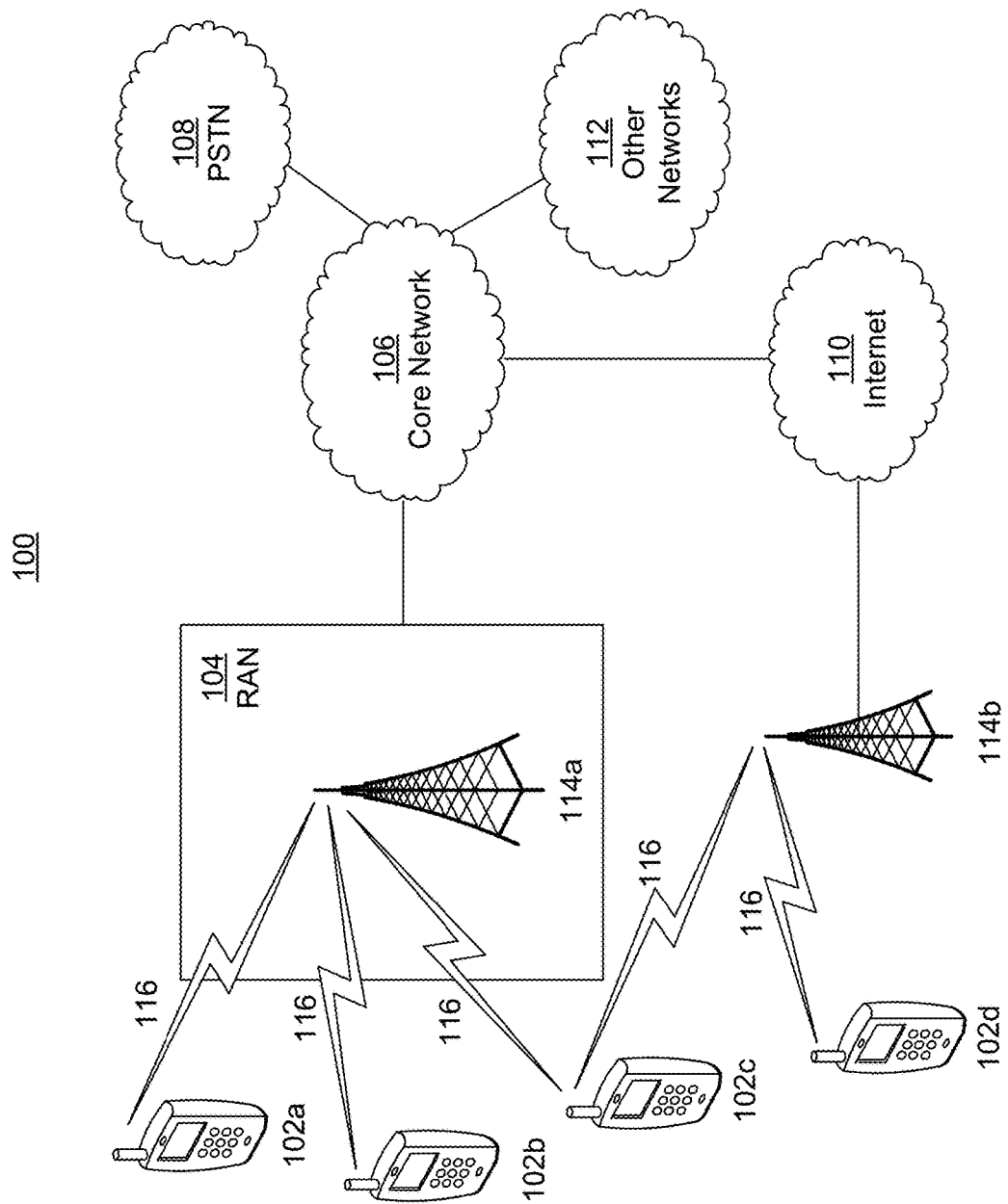
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an encode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
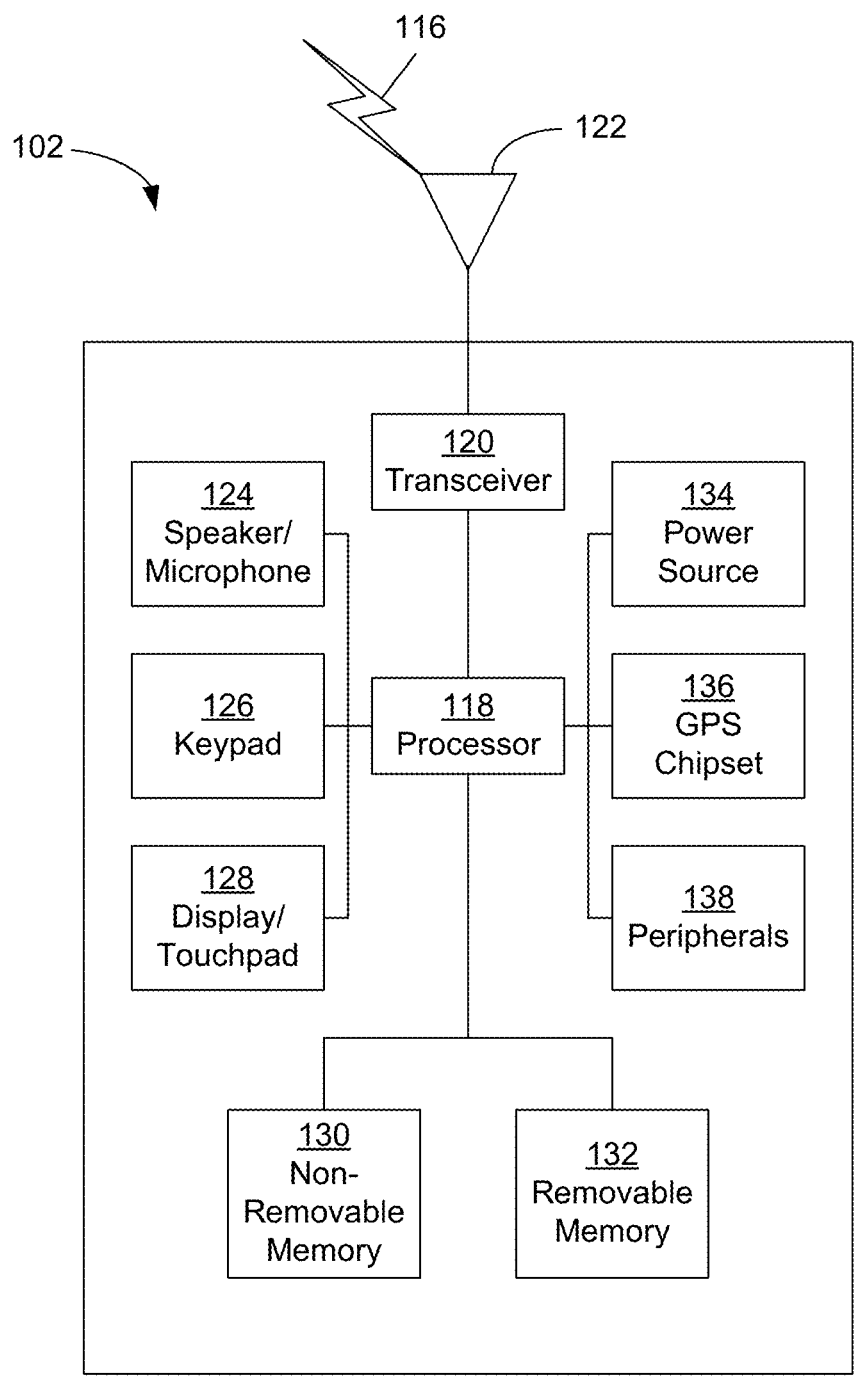
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
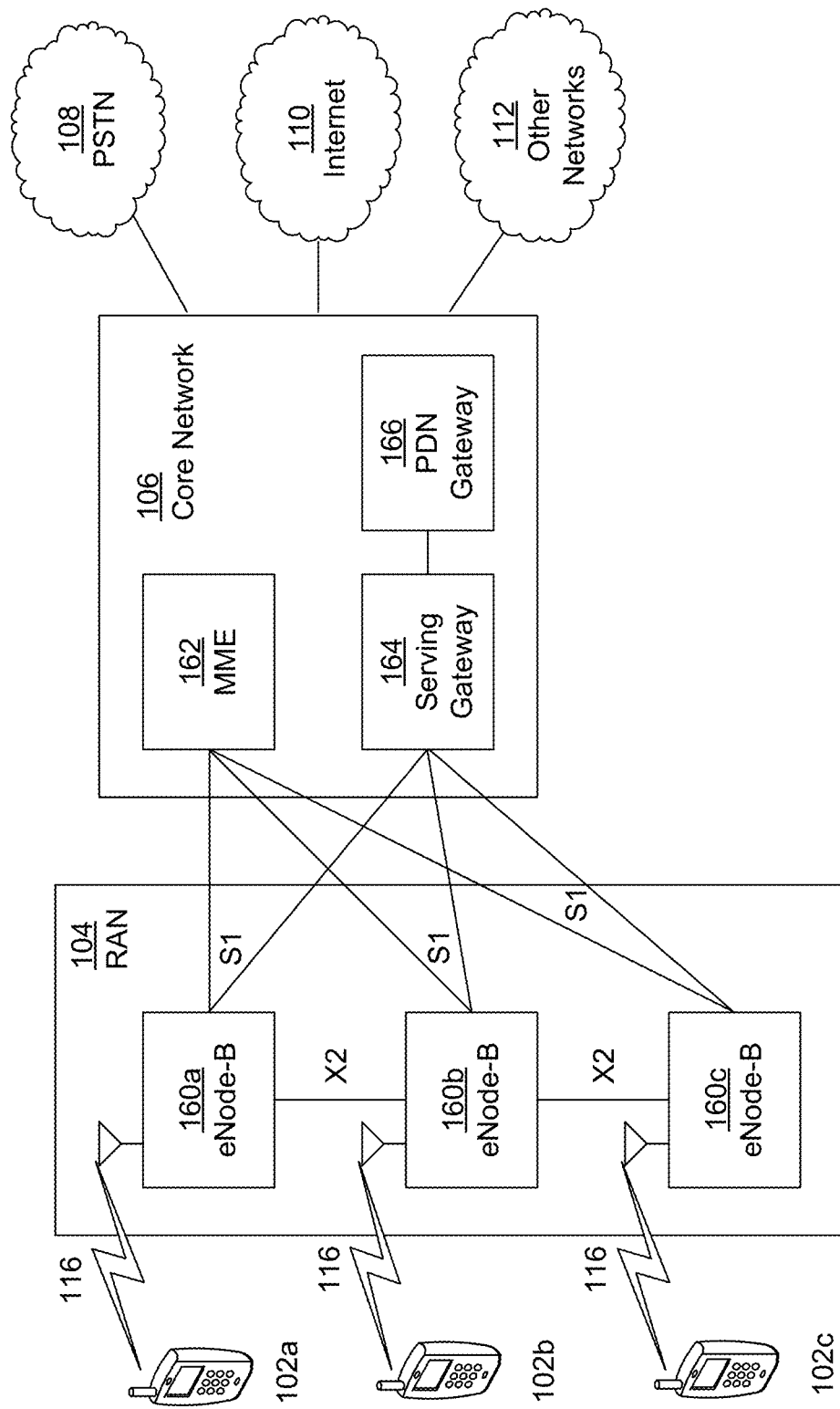
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHZ, and 20 MHz bandwidths in the TV White Space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHz, 8 MHZ, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
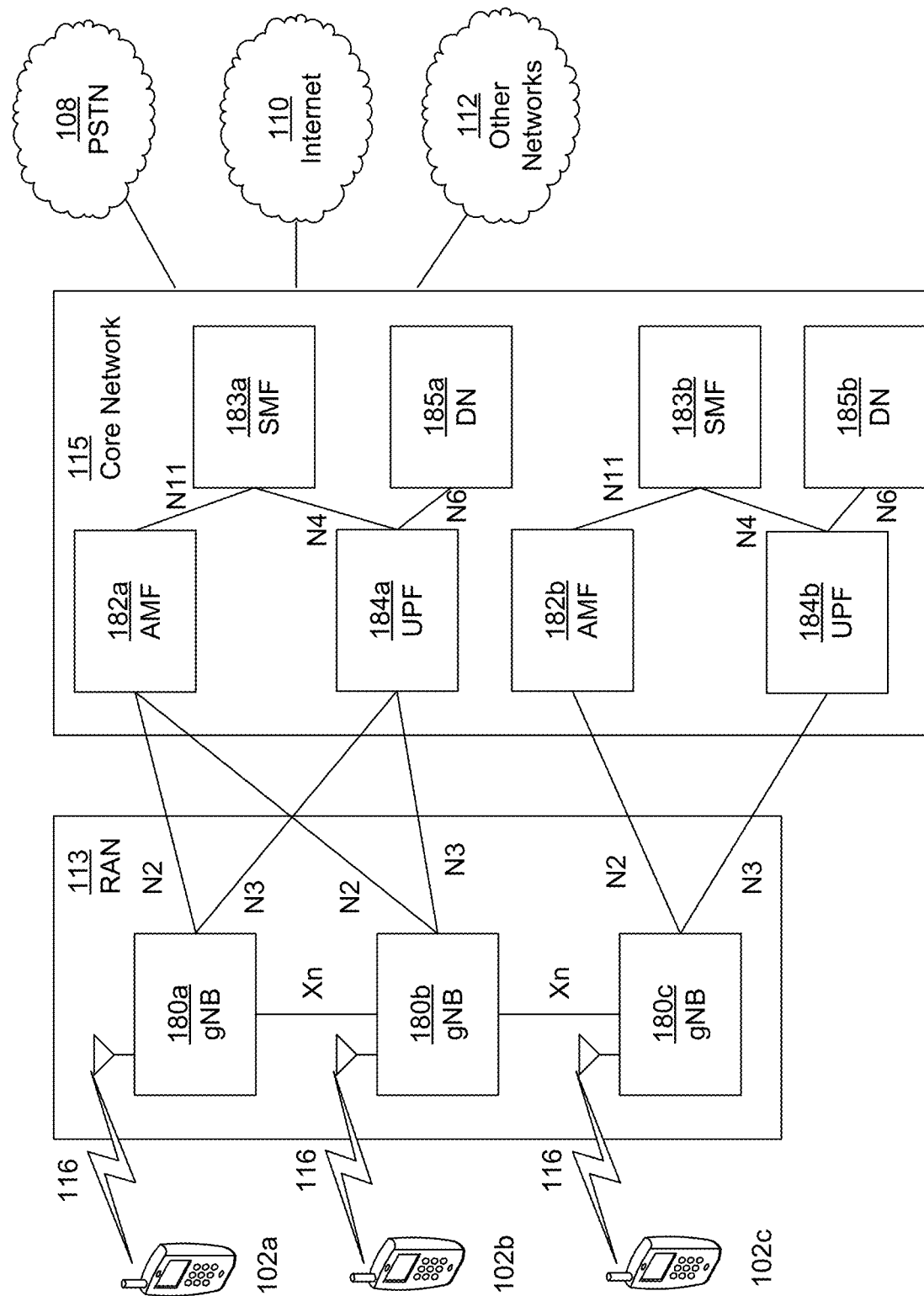
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A wireless transmit-receive unit (WTRU) may be configured to indicate SL failures (e.g., LBT failure, CSLF, etc.) to a network. The WTRU may perform a LBT operation associated with a SL. The WTRU may determine a CSLF associated with the SL. The CSLF may be determined based on a number of SL LBT failures being above a value. The WTRU may increase the number of SL LBT failures based on one or more failure events. The failure events may include a condition that SL control information (SCI) is not received from another WTRU on a bandwidth (BW) associated with the LBT operation. The failure events may include a condition that a channel busy ratio (CBR) is below a certain value. The WTRU may determine a carrier for reporting the CSLF associated with the SL, for example, based on a priority rule. For example, the priority rule may indicate that a licensed carrier (e.g., a licensed SL carrier or a licensed UL carrier) has a higher priority than an UL carrier (e.g., unlicensed UL carrier) on which a consistent LBT failure is not detected. The priority rule may indicate that an UL carrier (e.g., an unlicensed UL carrier) on which the consistent LBT failure is not detected has a higher priority than an unlicensed SL carrier for which a CSLF associated with the unlicensed SL carrier is not detected. The WTRU may report the CSLF associated with the SL to a base station using the determined carrier. For example, an indication of the CSLF may be multiplexed on a transport block. The indication of the CSLF may include a Medium Access Control (MAC) control element (CE) that comprises a destination WTRU ID and/or a resource block set on which the CSLF is detected. In some examples, the WTRU may be configured to report an indication of a SL LBT failure to a base station (e.g., NACK on PUCCH or MAC CE, for each SL LBT failure).

A WTRU may report an indication of LBT failure (e.g., a NACK on PUCCH or an explicit indication), received signal strength indicator (RSSI), or channel occupancy, for example, to a base station such as a gNB. The WTRU may be configured to detect a CSLF on an SL channel. If both an UL (e.g., an Uu link) and an SL are on the same carrier, a consistent LBT failure may be detected on both if a consistent LBT failure is detected on either medium access control (MAC) entity. The WTRU may be configured to multiplex a SL LBT failure MAC control element (CE) on a transport block (TB) (e.g., a new TB) and may transmit the TB on Uu, which may include whether SL or Uu failed LBT and a destination WTRU ID in the CE contents. The WTRU may be configured to prioritize the selection of the carrier on which the MAC CE is transmitted per the following availability sequence: licensed carriers (e.g., SL licensed carrier(s) or UL licensed carrier(s)), carriers of UL (e.g., unlicensed UL carriers) on which no consistent LBT failure is detected, unlicensed carriers of SL for which consistent sidelink LBT failure (CSLF) was not detected. The WTRU may be configured to relay the TB using Uu-PUSCH and may include the destination WTRU ID for the TB, e.g., if a peer WTRU is in coverage.

A WTRU may be configured to detect a CSLF on SL channel. The WTRU may be configured to switch to (e.g., select) a different data resource pool on a different LBT bandwidth (e.g., carrier, BWP, or sub-BWP). The WTRU may be configured to transmit an LBT failure indication (e.g., an SCI or a SL LBT failure MAC CE), which may include a destination WTRU ID in the CE contents. The WTRU may be configured to relay the TB that failed LBT through a different third WTRU connected to a receiving WTRU. The WTRU may be configured to relay the LBT failure indication, SCI, or the LBT failure MAC CE via a third WTRU connected to a peer WTRU.

A WTRU may switch RB set(s), for example, following an LBT failure. A peer WTRU may provide a channel sensing indication to a tx WTRU, for example, indicating which of monitored RB sets are sensed to be idle. The tx WTRU may include an SCI or a MAC CE, for example, along with TB/SL data transmission(s), indicating which RB sets are sensed to be idle. Following an LBT failure, the peer WTRU may switch to another RB set from the monitored RB sets to transmit the Hybrid Automatic Repeat Request (HARQ) feedback or SCI in response to received SL data. The tx WTRU may retransmit the TB that was unacknowledged or is associated with a failed LBT operation on a different RB set or resource pool, for example, after receiving feedback, acknowledgment, or an SCI from the peer WTRU. The tx WTRU may maintain a CSLF process, for example, per RB set.

References herein to a gNB may refer to an example base station and the gNB may be substituted with any other suitable base station. Reference to a timer herein may refer to a time, a time period/duration, tracking the time, tracking the time period/duration, etc. Reference to starting a timer may refer to the time period/duration having started, having started being tracked, etc. Reference to a timer expiration herein may refer to determining that the time has occurred or that the time period/duration has expired. Reference to that a timer is running may indicate that the started/tracked time period/duration has not expired. Reference to a counter herein may refer to a number of event occurrences, tracking the number of event occurrences, etc. Reference to a counter expiration herein may refer to determining that the number of event occurrences has reached or exceeded a pre-defined limit/threshold.

Unlicensed operation may be implemented. Channel access in an unlicensed frequency band may use a Listen-Before-Talk (LBT) mechanism. In some examples, LBT may be mandated, e.g., independently of whether the channel is occupied or not. In some examples, transmission (e.g., immediate transmission) following a short switching gap may be applied.

In the case of frame-based systems, LBT may be characterized by a Clear Channel Assessment (CCA) time (e.g., ~20 μs), a Channel Occupancy time (e.g., minimum 1 ms, maximum 10 ms), an idle period (e.g., minimum 5% of channel occupancy time), a fixed frame period (e.g., equal to the channel occupancy time+idle period), a short control signaling transmission time (e.g., maximum duty cycle of 5% within an observation period of 50 ms), and/or a CAA energy detection threshold.

In the case of load-based systems (e.g., wherein the transmit/receive structure may not be fixed in time), LBT may be characterized by a number N corresponding to the number of clear idle slots in extended CCA (e.g., instead of the fixed frame period). N may be selected (e.g., randomly) within a range.

Radio access technology (RAT) operation (e.g., new radio (NR) operation) may be implemented in unlicensed bands. The RAT operation (e.g., the NR operation) may support flexible transmission duration within a slot. The RAT operation (e.g., the NR operation) may support configured grant type-1 for UL transmissions, e.g., wherein the network may (e.g., semi-statically) configure an UL grant and the WTRU may (e.g., autonomously) use it without a L1 indication/activation. Configured grant type-2 may be similar to type-1 and may consider L1 indication/activation. The RAT (e.g., the NR operation) may support DL SPS resources (or DL configured grants), on which the WTRU may receive DL data on active DL CGs, e.g., with no scheduling necessary for each DL transport block (TB).

The RAT operation (e.g., the NR operation) in unlicensed band (NR-U) may be supported for the Uu link between the WTRU and the base station (e.g., the gNB), which may include initial access, Scheduling/HARQ, and mobility. Coexistence methods with other RAT(s) (e.g., LTE-license assisted access (LAA) or other incumbent RATs) may be supported. Deployment scenarios may include different standalone RAT-based (e.g., NR-based) operation, different variants of dual connectivity operation (e.g., EN-DC with at least one carrier operating according to the LTE radio access technology (RAT) or NR DC with at least two set of one or more carriers operating according to the NR RAT), and/or different variants of carrier aggregation (CA) (e.g., which may include different combinations of zero or more carriers of each of LTE and NR RATs). The RAT unlicensed operation (e.g., NR-U) may support configured grant transmissions and/or CBG based transmissions for the configured grant.

The RAT unlicensed operation (e.g., NR-U) may support Sidelink (SL) between WTRUs. PHY Layer Signals and/or Channels may be modified, e.g., to support the RAT operation (e.g., the NR operation) in unlicensed spectrum. To support the RAT operation (e.g., NR) in unlicensed spectrum, one or more of the following modifications may be made to the PHY layer signals and/or channels. A modification may be that DCI 2_0 is enhanced to provide time and frequency domain channel occupancy time (COT) structure. A modification may be that search space group switching feature is introduced, e.g., wherein a WTRU may be controlled (e.g., dynamically) to perform PDCCH monitoring using one of two groups of search space sets. A modification may be that additional PDSCH mapping type B lengths are introduced to enable a transmission at the beginning of a COT (e.g., immediately), e.g., in response to that the COT is initiated. A modification may be that a search space may be configured with multiple monitoring locations in frequency domain, e.g., to enable PDCCH monitoring across multiple LBT bands. A modification may be that interlace structure is introduced for PUCCH and PUSCH, and/or PUCCH format(s) are extended to PRB interlace waveform and included within one RB set. A modification may be that SRS transmission may be on a symbol of a slot (e.g., any symbol of a slot). A modification may be that a base station (e.g., gNB) is able to schedule multiple contiguous PUSCHs by a single DCI format A WTRU operating in shared spectrum may perform LBT to access a channel (e.g., using PHY layer procedure(s)). The RAT unlicensed operation (e.g., NR-U) may support dynamic channel access (e.g., using load based equipment (LBE)) and semi-static channel access (e.g., using frame based equipment (FBE)). In the case of FBE, a base station (e.g., only a base station, which may be a gNB) may be able to initiate a COT at specific times informed by its FFP (Fixed Frame Period) configuration. A WTRU may (e.g., may be able to) share a semi-static channel if a gNB DL transmission is detected in an earlier part of the same FFP. A WTRU may be configured with a UE-FFP and may initiate COTs at specific times determined from its WTRU-FFP configuration.

CCA (Clear channel assessment) may be performed in units of a frequency range (e.g., 20 MHz). The following types of LBT (Listen Before Talk) may be specified: CAT4 LBT (Type 1); CAT2 LBT (Type 2A); CAT2 LBT (Type 2B); and/or CAT1 LBT (Type 2C).

A COT may be initiated, e.g., using a CAT4 LBT. The COT may be shared by a node that received a transmission from the COT-initiating node (e.g., using a CAT2 LBT or CAT1 LBT), which may depend on the gap size between the transmissions at the switching point.

Consistent UL LBT Failures may occur. Radio link failure (RLF) (e.g., in NR) due to radio link failures (e.g., UL radio link failures) may be triggered in response to reaching maximum number of re-transmissions indicated by RLC, and/or in response to reaching a maximum number of preamble transmissions resulting in a random-access problem indicated by MAC. Such triggers may occur too late in an unlicensed operation (e.g., NR-U) scenario, e.g., wherein channel acquisition load conditions may increase (e.g., unexpectedly) (e.g., due to a hidden node or persistent interference affecting one direction). An additional RLF criterion that triggers if the WTRU fails to access the channel (e.g., repeatedly) may be used.

The channel may not be symmetric for UL and DL directions (e.g., due to hidden nodes). In the case of sidelink, a first WTRU (e.g., a receiving WTRU) may be able to sense the channel as idle and a second WTRU (e.g., a transmitting WTRU) may not be able to acquire the channel (e.g., due to spatial interference affecting one of the two WTRUs). A radio link failure and a recovery mechanism based on LBT failures may (e.g., preferably) be handled separately from that used by the gNB or that used for RLF on the sidelink. An explicit RLF mechanism based on UL LBT failure may be used (e.g., needed), e.g., given that some MAC counters for UL procedures (e.g., RACH and/or SR) may not be incremented if UL LBT fails.

A hidden node may be present and may affect channel acquisition. In the case that the RSSI or CO measures the interference from the hidden node, the WTRU may not be able to report this RSSI/CO (e.g., because it cannot access the channel). The reporting periodicity may not be timely enough for the WTRU to determine an occurrence of a persistent LBT failure and/or take necessary corrective actions on time (e.g., due to a newly arrived hidden node), for example, given RSSI is reported on periodical basis. A consistent UL LBT failure may be characterized by detection of a repeated number of UL LBT failures. Such failure may be reported by the WTRU to the network on a different serving cell. In one or more examples herein, a persistent LBT failure and a consistent LBT failure may be used interchangeably.

A mechanism for recovery and/or reporting a consistent UL LBT failure may be supported for the Uu link. The WTRU may detect and may trigger a consistent UL LBT failure, e.g., in response to counting a configured number of LBT failures. The WTRU may report the LBT failure to the gNB following declaring a consistent LBT failure on a given cell, e.g., by multiplexing an LBT failure MAC CE in an available UL grant. The WTRU may trigger a recovery procedure following detecting an UL LBT failure on the SpCell, e.g., by switching to a different bandwidth part (BWP) (on which UL LBT failure may not have been detected) and/or by initiating a RA procedure (e.g., new RA procedure) on that BWP.

Herein, the term LBT failure may imply that the WTRU was not able to acquire a channel for an UL or SL transmission attempt following a CCA part of an LBT procedure, which may be determined based on receiving a notification of LBT failure and/or indication of LBT failure, e.g., from the physical layer. Herein, the term LBT success may imply that the WTRU was able to acquire a channel for an UL or SL transmission attempt following a CCA part of an LBT procedure, which may be determined based on receiving a notification of LBT failure and/or indication of LBT failure, e.g., from the physical layer. The WTRU may determine that LBT operation(s) failed if the channel sensing measurement (e.g., RSSI) is above a threshold.

A MAC CE (e.g., an SL LBT failure MAC CE) may be used to indicate a detected LBT failure. The detected LBT failure may be reported by the WTRU using one or more of a MAC CE, a CE, or uplink control information (UCI). Herein, the term RB set and the term LBT bandwidth may be used interchangeably, either of which may be used to refer to a bandwidth subset of a carrier (e.g., a carrier on which an LBT operation is performed).

An acquisition probability for unlicensed channel(s) may not be symmetric among different directions of a commination link, for example, due to hidden node(s) and/or spatially separated inter-system interference. In examples associated with SL, a first WTRU (e.g., a receiving WTRU) may be able to sense the channel as idle and a second WTRU (e.g., a transmitting WTRU) may not be able to acquire the channel, e.g., due to a spatial interference affecting one of the first WTRU and the second WTRU. A gNB may sense the channel to be IDLE and a WTRU (e.g., a WTRU intending to transmit on the SL channel) may sense the channel as occupied, e.g., due to a systematic (e.g., non-temporal) interference that affects the SL channel, which, for example, may occur on a persistent basis.

On an SL (e.g., unlike Uu), the gNB may not be aware of whether a WTRU succeeded or failed an LBT attempt for a transmission on a scheduled grant or a configured grant, which may be issued for SL mode 1. For example, by performing a blind detection on an UL grant resource on an UL (e.g., an Uu link), the gNB may not detect whether the WTRU succeeded or failed an LBT attempt (e.g., because the gNB is not the receiving node). The gNB may not be able to issue (e.g., dynamically) a retransmission grant, for example, without feedback from the transmitting WTRU. The retransmission grant may indicate different parameters that may enhance a channel acquisition probability. If the UL is on a licensed spectrum, the WTRU may transmit HARQ feedback on a PUCCH. If the UL and the SL are on an unlicensed spectrum, the transmitting WTRU may not transmit on the SL or the PUCCH, e.g., due to the systematic spatial interference.

In the case of SL transmission mode 2, the gNB and/or a receiving WTRU may not be aware of LBT failure(s) which may occur on the SL channel of a WTRU (e.g., the WTRU intending to transmit on the SL channel). The WTRU experiencing LBT failure(s) may be out of network coverage.

SL LBT failure(s) may occur consistently. A CSLF may be detected. A recovery from a CSLF and/or reporting a CSLF may be beneficial. A recovery from a CSLF and/or reporting a CSLF may mitigate an issue in one or more examples herein before an RLF on the SL channel is declared. In one or more examples herein, the term triggering a CSLF and the term declaring a CSLF may be used interchangeably. The term triggered CSLF and declared CSLF and the like the like are used interchangeably.

A WTRU may be configured to monitor for, maintain a finding of, detect, declare, and/or report a CSLF. A WTRU may maintain and/or monitor a CSLF status, e.g., by counting a number of failure events (e.g., channel access failure events). The WTRU may use a counter (e.g., a CSLF counter) to count the number of failure events. A WTRU may trigger a CSLF report and/or a recovery procedure, for example, if a CSLF counter is greater than or equal to a value (e.g., a configurable value). A WTRU may reset a CSLF counter (e.g., to 0), for example, if a time duration associated with CSLF (e.g., an associated CSLF timer) expires.

The WTRU may start a timer, e.g., in response to having counted a number of LBT failures on the SL. In response to expiry of such timer, the WTRU may trigger a CSLF. The WTRU may increment a CSLF counter once (e.g., only once) during a configured or predefined period. The WTRU may count (e.g., only count) a single LBT failure when one or more LBT failures occur.

A WTRU may determine the number of failure events, for example, by using a counter. The counter may increment when a failure event is determined. The counter may include a CSLF counter. A CSLF counter may count failure event(s). A failure event may include an LBT failure by a transmitting WTRU, e.g., on the SL or the Uu, or on the SL and the Uu. A failure event may include an LBT failure by a receiving WTRU. A failure event may include an LBT failure by a peer WTRU (e.g., a WTRU different from the WTRU that maintains the counter). A failure event may include an LBT failure over a channel used for Uu (e.g., for only Uu), or a channel used for SL (e.g., for only SL), or a channel used for Uu and SL. For example, a WTRU may perform an LBT procedure (e.g., a procedure including a CCA) over an SL bandwidth. The WTRU may determine a failure event based on the performed LBT procedure. A failure event may include an LBT failure over an SL resource (e.g., a sub-resource).

A failure event may include an LBT failure on a resource pool or an RB set. For example, the SL bandwidth over which the LBT procedure is performed may include an RB set. A failure event may occur on the RB set of the SL bandwidth. A failure event may include a failure to receive a transmission from a peer WTRU. A failure event may include a failure to receive a HARQ-ACK from a peer WTRU (e.g., on physical sidelink feedback channel (PSFCH)). A failure event may include a failure to detect an SCI from a peer WTRU. A failure event may include the case of CBR value being above or below a threshold. A failure event may include a RSSI measurement being above or below a threshold. A failure event may include reception of an indication of a failure event from a peer WTRU. A failure event may include a delay budget window expiration. A failure event may include an LBT failure for an LBT operation of a certain type (e.g., LBT type-1 or type-2). A failure event may be determined based on whether an LBT failure is due to inter-WTRU blocking on an SL channel. A failure event may be determined based on whether an LBT failure is reported (e.g., to a gNB). A failure event may be determined based on whether the Channel Access Priority Class (CAPC) type of the LBT operation performed is from a certain subset (e.g., with a certain priority or above a certain value).

An LBT failure may be defined as a failure to complete an LBT procedure in time for a transmission. An LBT failure may be defined as sensing that the energy on a channel is greater than a threshold. The WTRU may increment the CSLF counter, for example, if (e.g., only if) a subset of the conditions is met (e.g., only if a subset of the failure events herein occurs).

A timer (e.g., a CSLF timer) may be started or restarted by any one of the failure events described herein and/or after a value (e.g., a configured or determined counter value) is reached.

A WTRU may maintain and/or monitor CSLF status(es), for example, by decrementing a CSLF timer at a (e.g., each) slot or transmission opportunity. A transmission opportunity may be a resource or time instance where the WTRU may perform a transmission, or a resource or time instance where a WTRU has performed a transmission, or a resource or time instance where a WTRU has attempted to perform a transmission and failed due to a channel access failure event. A WTRU may trigger a CSLF report and/or a recovery procedure, e.g., if a timer has expired.

A WTRU may determine whether to count a failure event, e.g., based on one or more of a signal type, a channel type, a sub-channel, or a resource pool. For example, a WTRU may maintain different CSLF counters for different signal types, different channel types, different sub-channels, and/or different resource pools. For example, a WTRU may maintain a CSLF counter according to one or more of the following: per RB set, per L2 ID, per cast ID, per cast type (e.g., unicast, groupcast, or broadcast), per SL BWP, per carrier, and/or per SL channel (e.g., per SL bandwidth). The WTRU may reset the CSLF counter, for example, based on a change (e.g., upon switching to another RB set or another resource pool associated with a different LBT channel).

A WTRU may maintain multiple LBT procedures (e.g., CSLF detection procedures). In examples, the LBT procedures may be performed simultaneously. For example, the WTRU may maintain a procedure per RB set or maintain a procedure per resource pool. The WTRU may reset the maintained procedure, for example, on an RB set based upon switching to a different RB set. The resetting of the maintained procedure may include resetting detection counters and/or a detection time (e.g., detection timers). In examples, a WTRU may perform an LBT procedure on a resource set (e.g., an RB set or resource pool, etc.), and, if the LBT procedure fails, the WTRU may increment the detection counter associated with the resource set (e.g., only the detection counter associated with the resource set) and/or may restart the detection time associated with the resource set (e.g., only the detection time associated with the resource set).

The WTRU may determine whether to count (e.g., using a CSLF counter) a failure event, for example, based on a cause of interference. For example, the WTRU may determine whether to count a failure event if a cause of interference is from a peer WTRU, from another WTRU sharing the resource pool, or from another node. The WTRU may differentiate a cause of interference, e.g., based on a CBR value or based on a detection and decoding of an SCI (or a preamble).

The WTRU may count a failure of an LBT operation, for example, if (e.g., only if) the CBR value is below (or equal to) a certain value, or the WTRU may count an LBT failure, for example, if (e.g., only if) the CBR value is above the value. The value may include a threshold. For example, a CBR value that is below the value may indicate that LBT failure is not due to inter-WTRU blocking. In some examples, the WTRU may count an LBT failure based on one or more of a CBR value, an RSSI, or an RSRP. The WTRU may count an LBT failure if the CBR value is below a first value such as a first threshold and/or if a channel measurement (e.g., RSSI or reference signal received power (RSRP)) is above or equal to (or below) a second value such as a second threshold. The WTRU may count an LBT failure based on a determination that a CBR value is within a range. For example, the WTRU may count an LBT failure, for example, if the CBR value is below a first value such as a first threshold and the CBR value is above a second value such as a second threshold.

A WTRU may maintain different counters for SL transmission(s) and for SL feedback. A WTRU may maintain different timers for SL transmission(s) and for SL feedback. In examples, the WTRU may maintain a first counter and/or timer for SL transmission(s) to a peer WTRU. The WTRU may maintain a second counter and/or timer for SL reception of feedback from the peer WTRU or for SL transmission(s) of feedback to the peer WTRU. Upon the expiry of a timer (e.g., the first timer or the second timer as described herein), a tx WTRU may determine a HARQ feedback value, and, for example, the tx WTRU may assume the HARQ feedback value to be a certain value (e.g., NACK) if a feedback or SCI has not been received from the peer WTRU. The peer WTRU (e.g., a rx WTRU) may monitor (e.g., attempt to decode) for an SCI reception, for example, at preconfigured or predetermined time(s) in relation to the timing of the LBT procedure (e.g., LBT occasions) and/or the start of the reception resource. The peer WTRU may switch to another RB set, for example, if a transmission (e.g., SCI or data) has not been received from the tx WTRU (e.g., no transmission has been received) and/or the timer has expired.

A peer WTRU may transmit an SCI indicating that a channel (e.g., a RB set or LBT BW) is sensed to be clear. The peer WTRU may probe a tx WTRU and/or send the channel sensing SCI (and/or other data/control information), for example, after a time period has passed without receiving data or control information from the tx WTRU.

The WTRU may count a failure of an LBT operation, for example, if (e.g., only if) SCI is received from a rx node (e.g., a peer WTRU). In examples, a tx WTRU may increment a CSLF counter, for example, if (e.g., only if) the SCI received from the rx node indicates that a channel is sensed to be idle/clear/available for transmission. A peer WTRU (e.g., a peer WTRU operating as the rx node) may transmit an indication (e.g., in an SCI or a MAC CE) indicating RB set(s) that are sensed to be idle and/or assumed to be available (e.g., for data or control information transfer from the perspective of the peer WTRU). The peer WTRU may sense the channel, and then send an indication (e.g., an indication that indicates "clear to send" or not), for example, per one or more RB sets, which, for example, may be within a given resource pool or spanning more than one resource pool. The tx WTRU may use a notification (e.g., the indication herein) to determine whether an LBT failure is due to a hidden node (e.g., a hidden node that is only affecting the tx WTRU but not the rx WTRU), for example, if an SCI is received by the tx WTRU from the peer WTRU indicating a clear channel on the RB set of concern. In some examples, the tx WTRU may use the notification to determine that an interference is affecting multiple WTRUs (e.g., the rx WTRU and the tx WTRU), for example, if an SCI not received or if SCI is received and indicates the RB set of concern is sensed to be occupied. The tx WTRU may then use this information for the determination of whether a CSLF is detected or not, among other uses.

A WTRU may be configured with CSLF parameter(s) (e.g., via received configuration information such as RRC configuration information). The CSLF parameter(s) may reuse LBT failure detection parameter(s) (e.g., persistent LBT failure detection parameter(s)). The WTRU may be configured to activate and/or deactivate a CSLF detection procedure. The WTRU may be configured with CSLF parameter(s) according to one or more of the following: per SL channel, per SL BWP, per SL carrier, per SL peer, and/or per RB set. For example, a tx WTRU may use the parameters configured for a newly activated RB set based upon switching to a different RB set.

For example, a WTRU may be configured with resource(s) (e.g., PUCCH resource(s)), on which the WTRU may report channel access behavior or performance of a SL channel. A WTRU may report (e.g., via a PUCCH transmission) a HARQ report (e.g., an enhanced HARQ report), which may indicate if an NACK occurred due to a channel access failure event. A WTRU may forward a CSLF report and/or the value associated with a peer WTRU to a base station, for example, via a resource (e.g., a dedicated resource, such as a PUCCH resource). The base station may include a gNB. In the case that the WTRU has UL resource(s) (e.g., dedicated UL resources) to report HARQ feedback (e.g., enhanced HARQ feedback) or the occurrence of one or more failure events, the WTRU may be configured to deactivate and/or disable a CSLF counter and/or timer. In some examples, a WTRU may reset a CSLF counter and/or timer in the case of reporting HARQ feedback (e.g., enhanced HARQ feedback) or the occurrence(s) of one or more failure events in a dedicated UL resource.

A CSLF process may be maintained, e.g., in the case that a transmission is dropped. A WTRU may drop a transmission based on an expiration of a time duration, e.g., due to a delay budget window expiring. A WTRU may have failed to perform transmission(s) (e.g., one, some, or all transmission(s)) during the delay budget window, for example, due to a channel access failure event. In response to a transmission being dropped due to an expiration of a delay budget window, the WTRU may report and/or declare a CSLF. A WTRU may report (e.g., to a base station) a failure to transmit a packet due to an expiration of a delay budget window. A WTRU may report (e.g., to a base station) if the failure to transmit a packet due to expiration of a delay budget window was caused by one or more channel access failure events. A WTRU may report (e.g., to a base station) a number of channel access failure event(s) that occurred for the packet during a delay budget window (e.g., prior to expiration of the delay budget window). A WTRU may report (e.g., to a base station) a percentage or a ratio of available transmission resources. For example, the WTRU may report the percentage or the ratio of available transmission resources during a delay budget window for which no transmission has occurred due to a channel access failure.

A WTRU may maintain a CSLF counter and/or a CSLF timer. If a delay budget window expires, the WTRU may not have further transmission(s) (e.g., scheduled and/or configured transmission(s)). A CSLF timer may expire, and/or the WTRU may reset a CSLF counter. An expiry of the CSLF timer and/or the resetting of the CSLF counter being reset may or may not indicate a channel experienced by the WTRU. If a delay budget window expires, a WTRU may pause a CSLF timer and restart it, e.g., in the case that a future or subsequent transmission is scheduled or configured. If a delay budget window expires, a WTRU may increment or increase a CSLF timer, e.g., by a configurable value. If a delay budget window expires, a WTRU may pause a CSLF timer and start a second timer. In the case that the WTRU is scheduled or configured for a subsequent transmission, the WTRU may stop the second timer and restart the CSLF timer. If the second timer expires (e.g., in the case that the WTRU is not scheduled or configured for a subsequent transmission), the WTRU may restart the CSLF timer.

A WTRU may use fractional CSLF counting. The WTRU may use fractional CSLF counting, e.g., in the case that a delay budget window expires and/or there is an interruption between transmissions. For example, a WTRU may maintain a CSLF counter. If the CSLF timer expires, or if the CSLF timer expires and the WTRU has no scheduled and/or configured transmissions (e.g., if a delay budget window expires), the WTRU may scale the CSLF counter by a value (e.g., a configurable value). The scaled CSLF counter value may be used as an initial counter value, e.g., if a channel access failure event counter (and, in some examples, a CSLF timer) is restarted in response to a future failure event.

A WTRU may select resource(s) for transmission(s) or retransmission(s) based on sensing result(s) and on a resource selection window. The resource selection window may start, for example, shortly after the trigger of a resource selection in the WTRU (e.g., the arrival of a TB). In examples, the maximum window size may be based on or bounded to the remaining delay budget of the TB.

A WTRU may increment a detection counter (e.g., an LBT failure counter for detecting CSLF) once (e.g., only once) per detection period. The detection period may correspond to a resource selection window and/or may start at the start of the resource selection window. In examples, the detection period may start at the first transmission occasion associated with resource(s) selected during a resource selection window. The detection period may start at the first LBT failure detected on resource(s) selected for a transmission during a resource selection window. The detection period may be configured or determined as the same duration as the resource selection window.

A WTRU may increment a detection counter once for the transmission and/or retransmission attempts of a specific HARQ process (e.g., only once for all of the transmission and/or retransmission attempts of a specific HARQ process). Such transmission/retransmission attempts may be associated with an SCI transmission that reserves or indicates multiple resources. Such transmission/retransmission attempts may be associated with multiple SL resources allocated by a DCI (e.g., a single DCI in mode 1). For example, the WTRU may be associated with multiple transmission occasions/attempts for which the WTRU may use until an LBT attempt succeeds. In that case, the WTRU may increase the counter (e.g., only once after all occasions have failed LBT procedure(s)).

A WTRU may count an LBT failure (e.g., only count one LBT failure) from a plurality of LBT failures indicated by the PHY within the detection period. The WTRU may receive x LBT failure indications from the WTRU PHY within a resource selection window. The WTRU may increment a detection counter (e.g., an LBT failure counter) by one, for example, only by one, for the detection period.

A WTRU may be configured with one or more PSFCH occasions in a bundle (e.g., a number of consecutive PSFCH occasions for HARQ feedback transmission(s) in an unlicensed spectrum). The WTRU may increment a detection counter once per bundle if an LBT procedure fails for feedback transmission(s) on the occasions within the bundle (e.g., only once per bundle if the LBT procedure fails for feedback transmission(s) on all occasions within the bundle).

A WTRU may be configured with one or more SL-SCH data and/or control (e.g., SCI) transmission occasions in a bundle. Within the bundle, the same TB may be retransmitted on the next occasion if an LBT attempt fails for one transmission occasion, and/or the SCI may be retransmitted on the next occasion within the bundle if an LBT attempt fails for one transmission occasion. The WTRU may increment a detection counter once per bundle (e.g., only once per data and/or control bundle), for example, after an LBT attempt fails for the last transmission occasion within the bundle and/or if an LBT procedure has failed on the transmission occasions within the bundle (e.g., the LBT attempts on all of the transmission occasions within the bundle have failed). In examples, the WTRU MAC may ignore LBT failure indications (e.g., for transmissions in a bundle) received from the WTRU PHY until the last occasion and/or may count one (e.g., only one) LBT failure indication for the bundled (e.g., the bundled transmission of data and/or control information).

A CSLF process may be configured. A CSLF process may include a CSLF counter and/or a CSLF timer. A WTRU may be configured with parameters associated to the CSLF counter and/or timer. CSLF process parameters may include one or more of: a maximum counter value; a counter scaling value; a timer duration; a maximum timer pause duration value; an associated LBT procedure or associated LBT set of parameters; associated RB set(s) or SL carrier(s); an associated WTRU or group of WTRUs; a recovery procedure associated with the CSLF process (e.g., whether the recovery and/or CSLF reporting performed is on Uu, whether the recovery involves switching to a different RB set). A WTRU may maintain different CSLF processes, e.g., for different LBT sets of parameters. In an example, a WTRU may have transmissions on different beams/channels, which may be associated with different LBT procedures (e.g., each beam/channel may be associated with an LBT procedure). The WTRU may maintain separate CSLF processes (e.g., one CSLF process for each beam/channel).

The WTRU may receive a CSLF parameter configuration, e.g., from a base station. The WTRU may have several sets of CSLF parameters and may select an appropriate set. The selection of the appropriate set of CSLF parameters may depend on at least one of: a SL mode (e.g., mode 1 or mode 2); a channel busy ratio (CBR) value; a maximum number of retransmissions; a traffic type; a cast destination ID; an L2 destination ID; a cast type; a channel occupancy value; an RSSI measurement value; or a channel or sub-channel or resource pool (e.g., an RB set, or the SL carrier used); or the number of parallel HARQ processes or resource selection processes being used by the WTRU in mode 2.

A WTRU may determine a CBR value, e.g., as a function of a CSLF determination. For example, a WTRU may modify a CBR value as a function of a declaration of CSLF or a specific CSLF counter or timer value.

An LBT failure process may be configured. A WTRU may maintain an LBT failure process, for example, for a radio link between the WTRU and a base station (e.g., an UL) on a shared or unlicensed spectrum, and a CSLF process (e.g., for an SL on a shared or unlicensed spectrum). The LBT failure process may include a persistent LBT failure process. For example, the WTRU may maintain a LBT failure process and a CSLF process (e.g., each LBT failure/CSLF process) independently. For example, the WTRU may determine whether to count a failure event in an LBT failure process or a CSLF failure process based on (e.g., as a function of) the type or purpose of an associated transmission (e.g., whether the transmission is for UL or SL). In some examples, an SL and an Uu link (e.g., a link that is between a base station and the WTRU) may be on a same shared or unlicensed spectrum (e.g., a band or a channel). In one or more examples herein, an Uu link may be in an unlicensed spectrum or licensed spectrum. The WTRU may maintain a joint process (e.g., a single joint process, which may be a joint LBT failure detection process) to account for Uu or SL channel access failure event(s). Whether the WTRU may maintain a joint LBT failure detection process for an Uu link and an SL may depend on LBT parameters for transmissions for the Uu link and/or for the SL. If the same LBT parameter(s) for transmissions (e.g., a beam and/or channel) are used for the Uu link and for the SL, the WTRU may maintain a joint LBT failure detection process. The WTRU may use the same CSLF process if the same set of physical resources are used for LBT operation(s) (e.g., the same BWP, carrier, and/or RB set), for example, regardless of the destination rx node.

In some examples, a WTRU may maintain a first LBT failure detection process for an Uu link, a second CSLF failure detection process for an SL, and a third joint process for the Uu link and SL. The WTRU may determine counter and/or timer parameter(s) for one or more of such process types (e.g., each process type).

The WTRU may determine whether to maintain separate LBT failure detection processes or a joint failure detection process (e.g., a single joint failure detection process) based on at least one of: an indication or configuration from a base station; an LBT type or set of parameters; an unlicensed spectrum, channel, or resource set; a traffic type; or a previous outcome of a separate or joint LBT failure detection process. The WTRU may determine a failure report type, e.g., based on whether a joint LBT failure process or separate LBT failure processes is/are used for an Uu link and an SL.

A CSLF process may be peer dependent. A group of WTRUs (e.g., the WTRUs that share a resource pool) may maintain a peer dependent or group CSLF process. A primary WTRU may maintain the peer dependent or group CSLF process. In response to a detection of a failure event, a non-primary WTRU may feed back to the primary WTRU a signal to increase a group CSLF count and may start (or restart) a CSLF timer. In some examples, the CSLF count and/or timer may be fed back to a base station, or an update may be received from the base station.

A WTRU (e.g., a primary WTRU) may determine whether to count a reported failure event from another WTRU, e.g., based on one or more of a cast ID, a cast type, or an L2 ID. The WTRU may count failure event(s) in a group CSLF process, e.g., based on a cast type (e.g., broadcast, groupcast or unicast). For example, the WTRU may count more than one (e.g., all) broadcast failure events in a group CSLF detection process.

A WTRU (e.g., a primary WTRU) may determine and/or count up to N (e.g., N may be greater than or equal to 1) failure events per period. A period may be a set of transmission resources on which a transmission may occur. The period may be determined from or associated with one or more of: a resource pool; an LBT bandwidth (BW); or an SL channel. Multiple WTRUs suffering from a failure event at a same time may not increase (e.g., unnecessarily) a CSLF counter. Increasing a CSLF counter unnecessarily may lead to a premature CSLF declaration or reporting.

A WTRU may declare and/or report CSLF(s) to a base station or to a peer WTRU. In response to a declaration of a CSLF, the WTRU may start a timer. During a time duration that the timer is running, the WTRU may not use an associated resource pool or an associated SL channel/sub-channel. The WTRU may monitor a channel/sub-channel/resource pool using a first monitoring state, e.g., prior to the declaration of a CSLF. The WTRU may adapt its monitoring to a second monitoring state on a channel/sub-channel/resource pool, for example, after declaring a CSLF, and, in some examples, may start a timer. If the timer expires, the WTRU may assume the channel/sub-channel/resource pool is back to a regular operation. The WTRU may (e.g., in response) return to the first monitoring state on the channel/sub-channel/resource pool. The WTRU may indicate (e.g., to a base station or to a peer WTRU) the return to the regular operation on the channel/sub-channel/resource pool.

Two sided LBT failure(s) may occur. In some scenarios, a systematic interference may affect multiple WTRUs (e.g., both a tx WTRU and a peer WTRU). The WTRUs may not be able to acquire a channel to transmit data and/or control information (e.g., one or more of SCI, HARQ feedback, or channel measurements). The WTRUs may attempt to detect a CSLF (e.g., a CSLF concerning a single unicast SL). A WTRU (e.g., the tx WTRU) may update the value of an LBT failure counter (e.g., a CSLF counter) based on an indication received from the peer WTRU, for example, on the same RB set or a different RB set.

In examples, a first WTRU (e.g., the rx WTRU, tx WTRU, or both WTRUs) may be configured to transmit periodic or aperiodic "alive signal(s) or SCI", for example, if it can be multiplexed with one or more of other data, SCI (other SCI), or buffer status report(s). The alive signal(s) or SCI may be associated with one RB set, or multiple RB sets (e.g., for a wideband operation or for overlapping RB sets). For a missed alive signal or SCI (e.g., for each missed alive signal or SCI), a second WTRU (e.g., the other WTRU) may increment an LBT failure counter (e.g., a CSLF counter). The WTRU (e.g., the first WTRU and/or the second WTRU) may switch to one or more of: a different RB set, a different resource pool, a different carrier, and/or a different BWP, based on the LBT failure counter reaching a value (e.g., a threshold of the maximum number of LBT failures counted). For a missed alive signal or SCI (e.g., for each missed alive signal or SCI), a WTRU (e.g., the other WTRU) may increment or start a timer (e.g., an LBT failure timer). A peer WTRU (e.g., the first WTRU and/or the second WTRU) may transmit an alive signal or SCI, for example, once per configured period (e.g., prior to or upon the expiry of an LBT failure detection timer). The WTRU (e.g., the first WTRU and/or the second WTRU) may switch to one or more of the following: a different RB set, a different resource pool, a different carrier, and/or a different BWP based on the expiry of the detection timer (e.g., an LBT failure detection timer). The WTRU (e.g., the first WTRU and/or the second WTRU) may determine and/or declare a CSLF based on the detection timer (e.g., upon the expiry of an LBT failure detection timer) or, for example, upon reaching the configured max number of failures counted. A WTRU (e.g., a peer WTRU) may indicate to the other WTRU (e.g., the first WTRU and/or the second WTRU) the time elapsed since the last successful channel acquisition for a given RB set and/or the number of LBT failures counted for a given RB set. A WTRU (e.g., either WTRU herein) may reset an LBT failure counter (e.g., an LBT failure detection counter) and/or a timer (e.g., an LBT failure timer) upon succeeding to acquire the channel (e.g., for the concerned RB set) or upon receiving an alive signal, data, or control information from a peer WTRU (e.g., on the concerned RB set).

A WTRU (e.g., each of the two WTRUs herein) may be configured with a plurality of RB sets or resource pools, for example, on independent/different LBT bandwidths, independent/different resource pools, or independent/different carriers. The WTRU may blind decode on all or a subset of resource pools and/or RB sets for the reception of data or control information on an SL channel. The WTRU may determine which subset of resource pools and/or RB sets to monitor (or blind decode) based on or as a function of one or more of the following: the resource used for the last transmission received, the resource used to transmit feedback (e.g., PSFCH) in response to a received TB, and/or the time elapsed since the last transmission was received. For example, the WTRU may be configured with a switching pattern, such that if the time elapsed since the last received data/control information on RB set x and/or the time since transmitting HARQ feedback in response to the data/control information on RB set x is larger than a configured first threshold, the WTRU may switch to blind decode on an RB set y, and if the time elapsed since the last received data/control information on RB set x and/or the time since transmitting HARQ feedback in response to the data/control information on RB set x is larger than a second threshold, the WTRU may switch to blind decode on an RB set z. RB set x, RB set y, and RB set z may or may not overlap.

The WTRU may stop blind decoding on a given RB set (e.g., a first RB set) based on one or more of the following: upon the reception of data, control information, SCI, or an alive signal from the peer WTRU on a second RB set; upon transmitting data, control information, SCI or an alive signal on a second RB set; and/or upon the reception of a confirmation or an acknowledgement (e.g., containing an indication that the peer WTRU has also stopped blind decoding on the first RB set) in response to the transmitted data or control signaling transmitted on the second RB set.

An LBT failure detection may impact MAC and/or RLF procedures. An SL RLF detection may be HARQ-based. A WTRU may maintain MAC counter(s) for SL procedures. An MAC counter may or may not increment when an LBT attempt fails for an SL transmission. In examples, the WTRU may not increment an SL MAC counter or suspend counting the SL MAC counter based upon detecting an LBT failure on a resource for a transmission associated with the SL MAC counter. The WTRU may avoid starting a MAC timer based upon detecting an LBT failure on a resource for a transmission associated with the MAC timer.

The WTRU may not increment the value of a discontinuous transmission (DTX) parameter numConsecutiveDTX based upon, for example, determining an LBT failure associated with the expected reception of a PSFCH transmission from a peer WTRU. The WTRU may determine whether to increment the DTX parameter numConsecutiveDTX based on one or more of the following.

The WTRU may determine whether to increment the DTX parameter numConsecutiveDTX based on determining that the peer WTRU has successfully acquired the channel but the PSFCH has not been received. The WTRU may determine whether to increment the DTX parameter numConsecutiveDTX based on whether the PSFCH reception is absent on the PSFCH reception occasion. The WTRU may determine whether to increment the DTX parameter numConsecutiveDTX based on whether a measured channel quality metric between multiple (e.g., the two WTRUs) is greater than a configured threshold.

The WTRU may determine whether to increment the DTX parameter numConsecutiveDTX based on whether a measured channel occupancy or RSSI is higher or lower than a configured threshold. The WTRU may be configured with predefined resource(s) to measure the channel occupancy or RSSI, for example, for a unicast link between WTRUs.

The WTRU may determine whether to increment the DTX parameter numConsecutiveDTX based on receiving an indication from the peer WTRU that the channel has been acquired. For example, the WTRU may increment (e.g., only increment) the value if periodic "alive signals or SCI" or clear to send signal is received from the peer WTRU that transmits a PSFCH transmission (e.g., within the part of the same COT on which the PSFCH transmission is expected).

The WTRU may determine whether to increment the DTX parameter numConsecutiveDTX based on whether a consistent LBT failure detection is configured for an SL MAC entity. For example, the WTRU may suspend counting for numConsecutiveDTX if a consistent LBT failure detection is configured, and may otherwise keep counting missing PSFCH transmissions if a consistent LBT failure detection is not configured.

The WTRU may determine whether to increment the DTX parameter numConsecutiveDTX based on whether the PSFCH falls in the COT initiated by the WTRU or not. For example, if the tx WTRU shares the COT with the peer WTRU and still doesn't receive a PSFSCH transmission on an occasion that falls within the same COT, the tx WTRU may then increment the numConsecutiveDTX count; otherwise, if the COT is not shared, the WTRU may not increment numConsecutiveDTX, or increment it by half (or every other time when the WTRU fails to receive a PSFSCH transmission on an occasion within the same COT).

The WTRU may determine whether to increment the DTX parameter numConsecutiveDTX based on whether any other data or control signaling is received from the same unicast link/peer WTRU, for example, in the same COT. The WTRU may determine whether to increment the DTX parameter numConsecutiveDTX based on whether the WTRU's own transmissions fail an LBT attempt or not in the slot(s) adjacent to the slot where a PSFCH transmission has been expected and a DTX is received instead of the PSFCH transmission. A slot is adjacent to the other slot if the slot is, for example, within a delta time period from the other slot. The WTRU may determine whether to increment the DTX parameter numConsecutiveDTX based on whether the PHY indicates a certain RSSI (e.g., an RSSI greater than a threshold) on the slot where a PSFCH transmission has been expected and a DTX is received instead of the PSFCH transmission.

The WTRU may skew or partially increment (e.g. instead of suspending the counting of) the DTX parameter numConsecutiveDTX based on one or more of the conditions herein being met. For example, the WTRU may increment the DTX parameter numConsecutiveDTX by one half (or count every other DTX) if the WTRU determines that an LBT attempt performed by the peer WTRU for the PSFCH occasion has failed. In some examples, if a tx WTRU shares a COT with the peer WTRU and still doesn't receive a PSFSCH transmission on an occasion that falls within the same COT, the tx WTRU may then increment the numConsecutiveDTX count, for example, by a scaled value. The WTRU may reset the DTX parameter numConsecutiveDTX (e.g., to a default value or to zero) based upon switching to a different resource pool and/or a different RB set (e.g., a different LBT bandwidth), for example, if counting of the DTX parameter numConsecutiveDTX is not suspended for LBT failure(s).

A WTRU may alter the DTX parameter numConsecutiveDTX after determining that an LBT procedure performed by the peer WTRU has failed including one or more failed LBT attempts for PSFCH reception occasion(s). For example, the WTRU may keep counting absent PSFCH occasions including the occasions missed due to one or more LBT failures at the peer WTRU; the WTRU may then decrement the counter by a value x, whereby x is indicated by the peer WTRU and/or determined by the WTRU itself from the number of missed PSFCH occasions (e.g., based on difference in channel measurements).

The WTRU may be configured with more than one values for a threshold parameter s/-maxNumConsecutiveDTX. The WTRU may apply a value of the configured values based on one or more of the following: whether the WTRU is receiving a PSFCH transmission on an unlicensed spectrum or licensed spectrum, the RB set or the resource pool on which the PSFCH transmission is received on, whether a CSLF is configured, the measured CBR of the resource pool, or other conditions herein.

In some examples, a WTRU may skip incrementing the DTX parameter numConsecutiveDTX, subtract a value from the DTX parameter numConsecutiveDTX or reset the DTX parameter numConsecutiveDTX if the WTRU attempts a transmission prior to an expected PSFCH resource where a DTX has been received, on the same slot as the expected PSFCH resource where a DTX has been received, or subsequent to the expected PSFCH resource where a DTX has been received, and an LBT attempt performed by the WTRU has failed.

A WTRU may be configured with one or more PSFCH reception occasions in a bundle (e.g., a number of consecutive PSFCH occasions for a feedback reception in an unlicensed spectrum). The WTRU may increment the DTX parameter numConsecutiveDTX after (e.g., only after) the last PSFCH reception occasion in the bundle. For example, the WTRU may be configured with x PSFCH reception occasions to monitor for a feedback reception after transmitting a TB in an unlicensed spectrum to a peer WTRU. The WTRU may increment the DTX parameter numConsecutiveDTX after not receiving a PSFCH transmission on or after the xth PSFCH reception occasion (e.g., after not receiving any PSFCH transmission on or after the xth occasion). In some examples, the WTRU may increment the DTX parameter numConsecutiveDTX after not receiving any PSFCH transmission on any of the x PSFCH occasions associated with the TB/HARQ process for which feedback is monitored.

SL may be prioritized over Uu link(s). A WTRU may prioritize a SL transmission over UL transmission(s) of the MAC entity or the other MAC (e.g., other Uu transmissions) if one of the following conditions are met: the WTRU has acquired a COT on the SL channel; the WTRU has failed an LBT attempt on the Uu UL (e.g., on PUCCH, PUSCH or RACH) transmission; the WTRU has acquired a COT for a TB retransmission on SL after one or a number of LBT failures; the MAC entity is not able to perform the SL transmission simultaneously with other UL transmission(s) at the time of the transmission.

A detected consistent LBT failure on SL may be reported. An LBT failure (e.g., a single LBT failure) may be reported. A WTRU may indicate (e.g., to a base station such as a gNB) a notification of an LBT failure, for example, in response to failing an LBT attempt for a grant (e.g., a grant issued for mode 1 SL scheduling). Reporting of CSLF(s) described herein may be applicable to a WTRU transmitting in SL mode 1 or SL mode 2.

A WTRU may indicate a notification of LBT failure (e.g., on a given RB set) to a peer WTRU, for example, upon changing to a different RB set, by transmitting the notification of LBT failure on an SCI or a MAC CE (e.g., a MAC CE part of another TB). Based upon the reception of such SCI or MAC CE, the peer WTRU may switch to another indicated RB set and/or transmit feedback to the received LBT failure notification. The peer WTRU may also report one or more of the following: LBT failure(s) or channel sensing/acquisition status, a preferred resource pool or RB set, and/or CBR measurement(s), to a tx WTRU, for example, on a per RB set basis. The peer WTRU may switch (e.g., autonomously switch, for example, without receiving an or a request) to a different RB set, for example, based upon determining that the tx WTRU has failed LBT operation(s) (e.g., a number of times) or if a time period has passed without receiving data or control information from the tx WTRU (e.g., without receiving any data or control information from the tx WTRU).

The indication may be provided as explicit signaling via one or more of the following: on a PUCCH, a UCI on a PUSCH, and/or part of a MAC CE. The indication may be implied implicitly, e.g., the indication may be in a form of a HARQ NACK for a HARQ process, which may be transmitted on a subset of PUCCH resources associated with (or configured for) such indication. In response to an LBT failure, the WTRU may include information on a channel part of the indication of an LBT failure reported to the base station, which may include one or more of RSSI, a channel occupancy, a resource set index, or information on resource allocation (e.g., an allocation of LBT bandwidth, carrier, and/or BWP). The WTRU may provide in the indication information regarding a reason of LBT failure, e.g., whether the LBT failure was due to other system interference and/or an intra-system congestion.

A WTRU may initiate an RRC connection to report a CSLF. A WTRU may detect a CSLF on an SL carrier or a set of resources. An in coverage (IC) WTRU may determine to report the CSLF, e.g., based on one or more conditions described herein. The WTRU may initiate or resume an RRC connection to report a CSLF. For example, the WTRU may initiate or resume the RRC connection following (e.g., immediately) a detection of the CSLF. The WTRU may initiate or resume the connection at a subsequent time. For example, the WTRU may have a CSLF report pending and may initiate or resume a connection in response to one of the following or a combination of more than one of the following time instances: a next time period associated with an allowed transmission of an UL transmission for the WTRU (e.g. via a RACH) has started; when the WTRU is able to acquire a channel to initiate or resume the connection; a fixed or configurable period of time has elapsed following a detection of the CSLF; or a reception of NW initiated paging.

A determination of which of the time instance(s) (e.g., as described herein), for example, in response to which the WTRU may initiate/resume a connection, may be based on properties associated with the CSLF and/or properties associated with one or more of a service, a priority, QoS of data, SL measurement(s), or other factor(s) associated with SL data at the WTRU.

In examples, a WTRU may determine whether to initiate an RRC connection to report a CSLF based on one or more of the following conditions. A WTRU may determine whether to initiate an RRC connection to report a CSLF based on whether the CSLF has been triggered on other resource sets or not. For example, a WTRU may initiate an RRC connection to report a CSLF when the WTRU is unable to recover from the situation by a change of a resource pool, an RB set, a resource set, etc. (e.g., only when the WTRU is unable to recover from the situation by a change of a resource pool, an RB set, a resource set, etc.). As an example, if a CSLF has been triggered on the (e.g., all of the) resource pools, RB sets, SL BWP, etc. that are available for the WTRU, the WTRU may initiate an RRC connection to report the CSLF.

A WTRU may determine whether to initiate an RRC connection to report a CSLF based on SL measurements. For example, a WTRU may perform measurements of a congestion on the resource pool where a CSLF has been triggered (e.g., CBR, or CBR-like measurements). If the CBR was greater than a threshold when the CSLF was triggered, the WTRU (e.g., the WTRU may be a remote WTRU) may initiate an RRC connection to report the CSLF.

A WTRU may determine whether to initiate an RRC connection to report a CSLF based on how often (e.g., a frequent by which) a CSLF is triggered on different resource sets. For example, a WTRU may trigger a CSLF and switch to another resource set to continue SL transmission(s). If the number of times for which such switching occurs is larger than a threshold within a defined period, the WTRU may initiate an RRC connection to report the CSLF.

A WTRU may determine whether to initiate an RRC connection to report a CSLF based on a cast type and/or unicast connections. For example, a WTRU may initiate an RRC connection to report a CSLF when sending an SL transmission to a relay WTRU. A WTRU may initiate an RRC connection to report a CSLF when sending an SL transmission for unicast, or when the WTRU had a unicast link set up when the CSLF was triggered.

A WTRU may determine whether to initiate an RRC connection to report a CSLF based on the QoS of transmission(s) by the WTRU or to the WTRU. For example, a WTRU may be configured with a set of QoS flows or PC5 5G NR Standardized QoS Identifiers (PQIs) which may trigger an RRC connection based upon a CSLF.

A WTRU may cancel a pending RRC connection/Resume, e.g., if a period of time expires and the WTRU has not initiated the RRC connection/Resume. A WTRU may cancel a pending RRC_connection/Resume, e.g., if a CSLF is cancelled (e.g., based on a condition described herein) and the WTRU has not initiated the RRC_connection/Resume.

A WTRU may report a CSLF and may remain in RRC_IDLE/RRC_INACTIVE, e.g., by using an inactive data transmission procedure, a RAN-based notification area update (RNAU) procedure, or a like transmission that does not involve a state transition.

A WTRU may be configured with different condition(s) for detecting/reporting a CSLF, e.g., depending on whether it is in RRC_CONNECTED or RRC_IDLE/RRC_INACTIVE. Such condition may relate to one or more of the priority of data, the cast of data, the type of a LBT failure, etc. A first condition (e.g., the priority of data is greater than a first threshold (e.g., threshold1) may be used to determine whether to report a CSLF if the WTRU is in RRC_CONNECTED. A second condition (e.g., the priority of data is greater than a second threshold (e.g., threshold2) may be used to determine whether to report a CSLF if the WTRU is not in RRC_CONNECTED. A WTRU (e.g., a remote WTRU) may indicate the resource set(s) in which a CSLF has been triggered (e.g., since the last time the WTRU was in RRC connected) based upon an initiation of an RRC connection.

A WTRU may report one or more failure events using an UL resource. A CSLF may be reported on Uu. A consistent LBT failure may be detected on an SL channel. A WTRU may report the failure (e.g., each consistent LBT failure detected on an SL channel), e.g., by multiplexing an LBT failure MAC CE on a PUSCH grant if the grant is available on an UL channel (e.g., an Uu channel). The SL LBT failure MAC CE may include one or more of the following: an indication of whether the consistent LBT failure is detected on an SL, an UL (e.g., an Uu link), or the SL and the UL; the destination ID of the WTRU associated with the SL channel (e.g., a L2 ID); the carrier ID on which a consistent LBT failure (e.g., a CSLF) was detected; the BWP, resource pool, or set of resources, or the like on which the consistent LBT failure was detected; the cast type associated with the SL used, e.g., if (e.g., only if) the receiver is not the destination WTRU; a request for an activation of a different CG/pool, SL carrier, and/or BWP; or the destination ID, priority, minimum communication range, or similar specific property of the SL transmission attempted and resulted in the LBT failure. In examples, the BWP, resource pool, or set of resources, or the like on which the consistent LBT failure was detected may be indicated in the form of a BWP ID, a resource pool ID, an LBT bandwidth ID, or an ID of the like, respectively.

A WTRU may determine a resource for reporting one or more failure events, for example, based on one or more of the following: whether the resource is licensed or unlicensed; whether the resource is an SL resource or an UL resource; whether the resource is associated with one or more failure events; the number of failure events associated with the resource; the cause(s) of the one or more failure events; whether a consistent LBT failure is associated with the resource.

The WTRU may determine the resource based on a priority rule. For example, to transmit or multiplex an MAC CE indicating an SL LBT failure (e.g., a CSLF), the WTRU may use a priority rule or a sequence for the selection of a resource (e.g., a resource associated with a carrier and/or link), on which the MAC CE may be transmitted/multiplexed. For example, the WTRU may use the following sequence for the selection of a resource (e.g., a resource which may be used as a data resource) on which to multiplex the MAC CE. The WTRU may prioritize the selection of licensed resource(s) over unlicensed resource(s). For example, the WTRU may prioritize the selection of resource(s) on licensed UL carrier(s) over resources(s) on unlicensed UL or SL carrier(s), for example, in the case of a PUSCH resource on an UL. The WTRU may select resource(s) on licensed UL carrier(s) for reporting a failure event before selecting resource(s) on unlicensed carrier(s) if the WTRU is in a coverage of a base station (e.g., a Uu link is available). A grant (e.g., an SL grant or an UL grant) may or may not be available. If a grant is not available, the WTRU may trigger an SR on a PUCCH. In examples, the SR may be transmitted on a PUCCH resource on a licensed carrier or a carrier on which consistent LBT failure was not detected.

The WTRU may prioritize the selection of resource(s) on licensed SL carrier(s) over resources(s) on unlicensed UL or SL carrier(s). In the case of a SL-SCH data resource on SL (e.g., if the WTRU is out of coverage of a base station), the WTRU may prioritize the selection of resources on licensed SL carrier(s) over unlicensed carrier(s) (e.g., selecting resources on licensed SL carrier(s) before selecting resources on unlicensed carrier(s).

The WTRU may determine that an unlicensed UL resource has a higher priority than an unlicensed SL resource. The priority rule may indicate that an unlicensed UL resource has a higher priority than an unlicensed SL resource if a consistent LBT failure is not detected on the unlicensed UL resource. For example, the priority rule may indicate that an unlicensed UL resource on which a consistent LBT failure is not detected has a higher priority than an unlicensed SL resource on which a CSLF is not detected. The WTRU may multiplex the MAC CE on a SL-SCH resource pool in an LBT bandwidth on which no consistent LBT failure is detected (e.g., a resource pool different from the one on which CSLF was detected), e.g., if (e.g., only if) the WTRU does not have an available UL grant for licensed or unlicensed UL resource. The prioritization rule or sequence may be predefined or indicated in configuration information (e.g., RRC configuration information).

Figure 2:
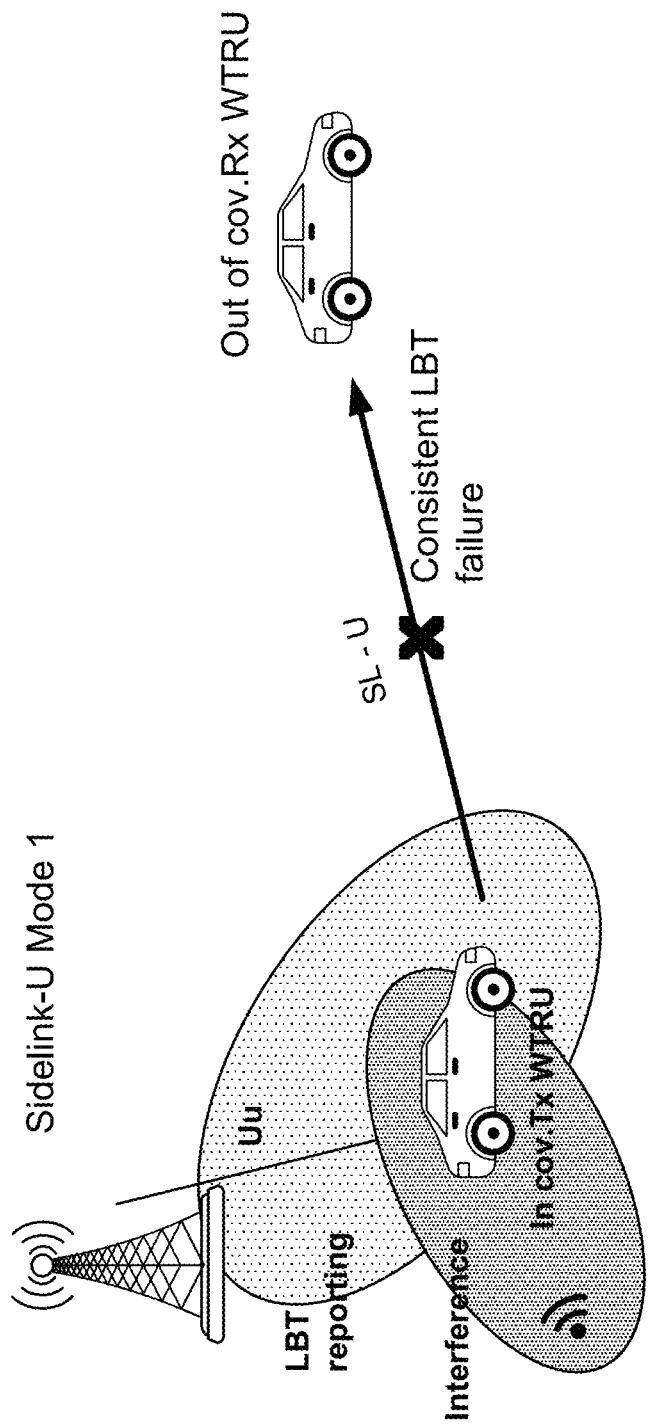
FIG. 2 is an example of a detected CSLF and LBT failure reporting on the Uu link.

FIG. 2 is an example of a detected CSLF and LBT failure reporting on an UL (e.g., an Uu link). As shown in FIG. 2, a tx WTRU that is in coverage of a network (e.g., a gNB) may detect one or more LBT failures on the SL (e.g., unlicensed SL) associated with a rx WTRU that is outside the coverage of the network. The tx WTRU may determine that a CSLF on the SL associated with the rx WTRU has occurred as shown in one or more examples herein, for example, based on the number of LBT failures on the SL associated with the rx WTRU. The tx WTRU may determine a resource on the UL for reporting the CSLF, for example, based on a priority rule in one or more examples herein. The tx WTRU may report the CSLF to the network via the UL (e.g., using the resource on the UL). The resource on the UL may be licensed or unlicensed. The WTRU may monitor a PDCCH in response to transmitting the LBT failure MAC CE on a PUSCH, e.g., for a configured period of time. The one or more LBT failures may be detected based on one or more failure events herein, for example, due to the interference shown in FIG. 2.

Figures 3, 4:
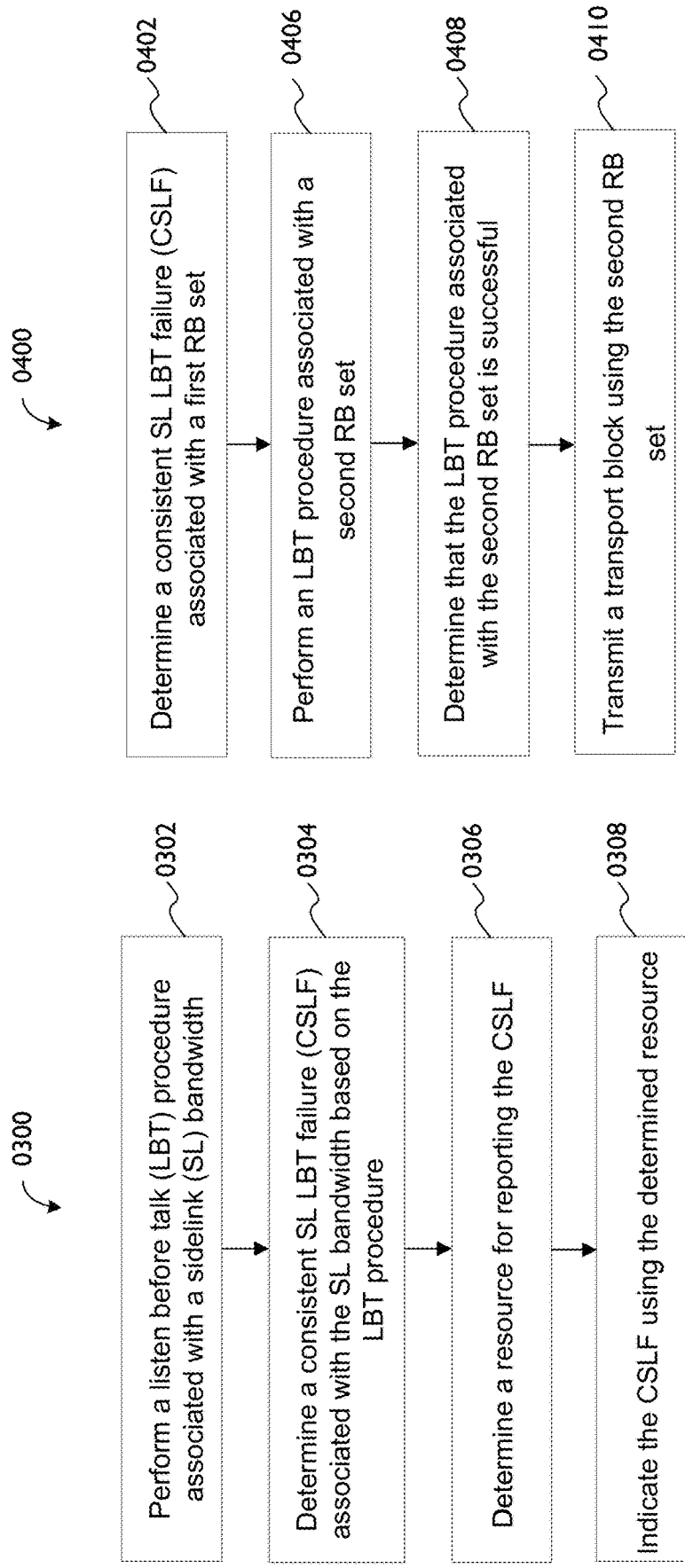
FIG. 3 illustrates an example 300 of reporting a CSLF.
FIG. 4 illustrates an example 400 of SL resource switching.

FIG. 3 illustrates an example 300 of reporting a CSLF. At 0302, a device (e.g., a WTRU) may perform an LBT procedure associated with an SL bandwidth. At 0304, the device may determine a CSLF associated with the SL bandwidth based on the LBT procedure. At 0306, the device may determine a resource for reporting the CSLF. At 0308, the device may indicate the CSLF using the determined resource.

A WTRU may report one or more failure events using an SL resource. A CSLF may be reported on SL. A consistent LBT failure may be detected on an SL channel. A WTRU may report the failure (e.g., each consistent LBT failure detected on an SL channel) on an SL-SCH resource or a SL control channel, e.g., by at least one of the following: multiplexing an LBT failure MAC CE on a SL-SCH data resource; switching to a different SL BWP, carrier, and/or data resource pool; transmitting SL control information indicating that a SL consistent LBT failure has been detected; or relaying the transport block (TB) that failed LBT, the SL LBT failure MAC CE, and/or the LBT failure indication SCI to a third WTRU that is connected to a peer WTRU. The third WTRU may (e.g., in response) relay the TB, MAC CE, and/or the failure indication/SCI to the receiving WTRU (e.g., the peer WTRU).

The WTRU may report a detected CSLF on an SL channel and/or may forward the failed TB on the SL channel, e.g., if one or more conditions are met, which may include: the WTRU is out of network coverage; a consistent LBT failure has been detected on the (e.g., all) unlicensed Uu carriers; the WTRU is transmitting in SL scheduling mode 2; or the WTRU has received an indication from the third WTRU (e.g., the relaying WTRU) that is connected to a peer WTRU.

The WTRU may report a CSLF (e.g., via MAC CE or SCI) to a WTRU (e.g., the third WTRU connected to the peer WTRU). In examples, the third WTRU may report the CSLF to the network (e.g., using the Uu link) (e.g., if it is in coverage) or to the peer WTRU connected to the third WTRU. The third WTRU may indicate a L2 ID of the WTRU that is experiences/detects a CSLF and/or the associated SL resource on which the CSLF has been detected.

The WTRU may transmit the CSLF report (e.g., a TB LBT failure MAC CE or a SCI indication) using a different SL carrier, a different resource pool, a different set of resources, or the like that is associated with a different LBT bandwidth from the one on which the CSLF was detected. The multiplexed LBT failure MAC CE may include an indication (e.g., to a peer WTRU) regarding a carrier or an SL data/control resource to activate or switch to, e.g., for subsequent data. The WTRU may transmit the LBT failure MAC CE on another active SL carrier on a data resource or a different resource pool from that on which the CSLF was detected. The WTRU may monitor (e.g., for a configured period of time) the SL control channel (e.g., for SCI), e.g., in response to transmitting the LBT failure MAC CE on an SL-SCH resource.

A WTRU may be configured (e.g., by the network or by upper layer(s) with a dedicated L2 ID, e.g., for reporting a CSLF on an SL. For example, a WTRU may transmit a CSLF in groupcast/broadcast and may use a (pre) configured L2 ID for a transmission of the report. A WTRU may be configured with a dedicated L2 ID specific to one or more of: a geographical location (zone); parameters/a type of LBT and/or COT sharing that caused the failure; a type of transmission (e.g., mode 1 or mode 2, periodic or one-shot, etc.); a carrier or a set of resources or a resource pool on which the CSLF was determined; a SL and/or Uu carrier; or a cast type of the transmission. For example, the WTRU may determine which of the (pre) configured L2 IDs to use for the transmission of the report based on the factor(s) described herein.

A WTRU may determine a cast type and/or intended recipient (e.g., a L2 ID) of a consistent LBT failure report. A WTRU may determine a cast type and/or intended recipient(s) (e.g., wherein an intended recipient(s) may be associated with an L2 ID or may be associated with a base station), for example, based on one of or a combination of more than one of the following factors.

A factor may be the cast type and/or intended recipient of pending transmission(s) (e.g., any pending transmissions) at the WTRU when a CSLF was detected and/or the PDU that was intended for the transmission on the SL grant. For example, a WTRU may transmit a CSLF to a unicast peer WTRU if the failure occurred while the WTRU was attempting to transmit to the peer WTRU. The WTRU may transmit the report using a first broadcast/groupcast L2 ID (e.g., dedicated to such) if the WTRU was attempting a transmission to a second broadcast/groupcast L2 ID, which may be different from or the same as the first broadcast/groupcast L2 ID.

A factor may be the SL mode (e.g., mode 1 or mode 2). For example, a WTRU operating in mode 1 may transmit a CSLF to a base station and a WTRU operating in mode 2 may transmit a CSLF to one or more peer WTRUs. A factor may be the ongoing service(s) or service(s) of interest at the WTRU. For example, a WTRU may transmit a CSLF using unicast to one or more peer WTRUs if the WTRU has ongoing unicast services (e.g., only unicast services), or the WTRU has unicast service(s) that has/have data available for transmission. The WTRU may transmit using broadcast if the WTRU has at least one ongoing groupcast/broadcast service (e.g., if the WTRU has data available for transmission).

A factor may be whether the SL and/or Uu, or a carrier (e.g., any such carrier) on SL and/or Uu is licensed or unlicensed. For example, the WTRU may transmit a CSLF to a base station if at least one of its Uu carriers is licensed. For example, the WTRU may transmit a CSLF to the base station if its SL carriers are not licensed (e.g., none of its SL carriers is licensed). For example, the WTRU may transmit a CSLF to a peer WTRU if its Uu carriers are not licensed (e.g., none of its Uu carriers is licensed) and at least one of its SL carriers is licensed.

A factor may be the coverage scenario (e.g., in coverage (IC) or out of coverage (OOC). For example, the WTRU may transmit a CSLF to a base station and/or a peer WTRU if the WTRU is in coverage. For example, the WTRU may transmit a CSLF to (e.g., only to) a peer WTRU if the WTRU is OOC. A factor may be the RRC state of the WTRU. For example, the WTRU may transmit a CSLF to a base station when (e.g., only when) the WTRU is in RRC_CONNECTED. A factor may be whether the WTRU is receiving a CSLF or generating a CSLF. For example, a WTRU may determine the intended recipient of a CSLF from the information in the CSLF (e.g., if the CSLF is received). If the WTRU (e.g., itself) generates the CSLF, the WTRU may determine the recipient based on other factors described herein.

A factor may be QoS of the pending data/SL services. For example, a WTRU may report a CSLF to a base station and/or a peer WTRU if a QoS property (e.g., priority) associated with data to be transmitted is above a configured or a preconfigured threshold. A CSLF may be reported to the network (NW), one or more peer WTRUs, or both, based on one or more of the factors.

A detected CSLF and/or reporting of a detected CSLF may be cancelled based on one or more of the following conditions. The WTRU may cancel a triggered CSLF, e.g., in response to performing at least one of the following: multiplexing an LBT failure MAC CE on a PUSCH transmission and/or on an SL data resource (e.g., a SL-SCH resource) that indicates the detected CSLF; transmitting a TB (e.g., with a successful LBT) that may contain an LBT failure MAC CE that indicates the detected CSLF; performing a successful LBT for an SL transmission and/or an UL transmission on the carrier and/or BWP and/or set of SL resources, on which a consistent LBT failure was detected; or receiving a response, a confirmation, a grant, HARQ feedback, and/or a reconfiguration (e.g., from a base station), which may be in response to the TB transmitted that contains the associated LBT failure MAC CE (e.g., relating to an associated HARQ process). The WTRU may start a CSLF declared timer, e.g., in response to detecting an SL LBT failure. The WTRU may stop the timer, e.g., in response to cancelling the triggered CSLF. During a time duration that the timer is running, the WTRU may keep reporting and/or multiplexing an LBT failure MAC CE for the declared CSLF. In some examples, the WTRU may multiplex an LBT failure MAC for a consistent failure detected on the SL (e.g., only once).

In response to expiry of the CSLF declared timer, the WTRU may cancel the detected CSLF, e.g., on an applicable SL carrier/BWP. In response to expiry of the CSLF declared timer, if the WTRU has not received a response (e.g., data or control) from a base station (e.g., in the case that the WTRU is within a network coverage), the WTRU may notify or report to an upper layer and/or may declare a radio link failure. In response to expiry of the CSLF declared timer, if the WTRU has not received a response (e.g., data or control) from the WTRU to which the CSLF MAC CE or SCI was transmitted, the WTRU may perform one or more of: notifying or reporting to upper layer; breaking the unicast link to the peer WTRU and/or discarding related configuration(s); or declaring a radio link failure.

A recovery from a consistent LBT failure detected on a SL may be implemented. SL resource switching may be implemented. In response to the detection(s) of one or more LBT failures (e.g. a CSLF), a WTRU may perform at least one of the following recovery actions: switching to a different active SL carrier; switching to a different SL BWP; activating a different SL carrier; switching to a different set of resources on a same BWP (e.g., a different data resource pool or RB set); (re)-transmitting the data and/or SCI; or transmitting a request to a gNB to activate a different set of SL resources/carrier/or BWP.

FIG. 4 illustrates an example 400 of SL resource switching. At 0402, a device (e.g., a WTRU) may determine a CSLF associated with a first RB set. At 0406, the device may perform an LBT procedure associated with the second RB set. The LBT procedure associated with the second RB set may be performed before the determination of the CSLF associated with the first RB set or after the determination of the CSLF associated with the first RB set. At 0408, the device may determine that the second LBT procedure is successful (e.g., based on a determination of a successful LBT attempt or a determination that a number of LBT failures associated with the second RB set is less than a value, for example, within a certain time). At 0410, the device may transmit a TB using the second RB set.

The WTRU may select a different set of SL or UL resources (e.g., a resource pool), which may be associated with a different LBT bandwidth on which a CSLF is not detected (e.g., or based on a determination that a number of LBT failures associated with the second RB set is less than a value, for example, within a certain time) in one or more of the following: after the detection of the CSLF; after failing an LBT once or a number of times (e.g., a configured or a predefined number of times, for example, as indicated by the value of the LBT failure counter associated with the CSLF process); after receiving SCI from a peer WTRU on a given RB set or resource pool, which may be used by the tx WTRU to retransmit the TB or SCI that failed LBT operation(s); and/or after the expiry of a timer (e.g., an RB set inactivity timer or an LBT failure timer).

A WTRU may switch (e.g., autonomously, for example, without receiving an indication or a request) to second resource(s), for example, after a detection of a CSLF on first resource(s). The second resource(s) may include an active set of UL or SL resources. The first resource(s) may include a first RB set. The second resource(s) may include a second RB set. For example, the WTRU may identify the second RB set after a detection of a CSLF on the first RB set. The WTRU may perform or have performed an LBT procedure on the second RB set and/or determine that a CSLF is not detected on the second RB set, for example, by determining that the LBT procedure on the second RB set is successful or determining that the number of LBT failures on the second RB set is less than a certain value (e.g., a maximum value or a threshold value to reach the CSLF). The first RB set and the second RB set may belong to the same resource pool or belong to different resource pools.

The WTRU may be configured with an association between resource sets, e.g., such that the WTRU may (e.g., may be able to) switch between a first resource set and a second resource set after the WTRU detects a failure event (e.g., one or more LBT failures) associated with either of the first resource set and the second resource set. The WTRU may switch to a second RB set (e.g., one within the same resource pool as a first RB set from which the WTRU may switch to the second RB set) following a detection of one or more LBT failures or a CSLF on the resource pool. The WTRU may restart a detection time (e.g., a CSLF detection timer) based upon switching to a different resource (e.g., a different resource pool). The WTRU may restart a detection time if the WTRU transmits or retransmits the data and/or control information that the WTRU was to but could not transmit on a resource that has failed LBT (e.g., conditioned on switching to a different RB set that shares or is maintained by the same CSLF process as a RB set on which CSLF is detected).

A WTRU may transmit a TB on a resource over which a CSLF is not detected. The TB may have been transmitted on a first resource if a CSLF had not been detected on the first resource. As shown in one or more examples herein, the WTRU may switch to a second resource based on a determination that a CSLF has been detected on the first resource. An LBT procedure on the second resource may be successful or the number of LBT failures on the second resource may be less than a certain value (e.g., a maximum value or a threshold value to reach the CSLF). The WTRU may transmit the TB on the second resource to which the WTRU switches from the first resource. In examples, a WTRU may prepare a TB for transmission on one or more resources, for example, until an LBT attempt succeeds on at least one of the resources. The TB may be or configured to be transmitted on one or more resource sets on different LBT bandwidths, BWPs, or SL carriers. An LBT procedure on at least one of the resources sets may be successful. For example, the WTRU may prepare a TB at the MAC layer (MAC) and may provide the TB to the physical layer (PHY) for a possible transmission on more than one resource sets. The WTRU at the PHY may attempt (e.g., successively) to transmit the TB on one resource set at a time, e.g., until the TB is transmitted with a successful LBT operation on a resource set. LBT operation and LBT attempt may be used interchangeably in one or more examples herein. The resource sets (e.g., RB sets) may be conditioned to belong to a resource pool (e.g., the same mode 2 resource pool). The WTRU (e.g., via the PHY) may attempt an LBT operation on more than one RB sets (e.g., RB sets that are contiguous in the frequency domain) simultaneously or successively and/or select an RB set to transmit the TB (or SCI) on, for example, from the RB sets that succeeded LBT operation(s).

A WTRU may determine which RB set and/or resource pool to switch to, for example, based on the RB set on which an LBT failure has been detected. The WTRU may change the WTRU's receive resource pool to monitor for an exchange of data and/or control information from a peer WTRU based upon switching to a different RB set or resource pool. An association (e.g., a linkage) between a tx resource pool and a rx resource pool may be assumed or configured. The WTRU may start a timer (e.g., an RB set inactivity timer) after determining an LBT failure on a given RB set and/or switching to a different RB set. Upon expiry of the timer, the WTRU may switch to a different RB set or resource pool (e.g., for transmission and/or reception), for example, if an LBT attempt has not succeeded for data and/or control transmission while the timer is running. Upon expiry of the timer, the WTRU may transmit on selected or reserved resource(s) (e.g., where the timer may apply as a tx backoff timer). The value of such timer (e.g. the RB set inactivity timer) may be configured or determined based on one or more of the following: configured by dedicated signaling; determined based on the CBR associated with the selected or reserved resource(s); determined based on an LBT indication received from the PHY; determined based on the number of LBT failures counted; determined based on the QoS or the priority of data associated with the TB to be transmitted or retransmitted; and/or determined from the value configured for a detection time (e.g., the LBT detection timer for the CSLF procedure).

The WTRU may select a different set or subset of mode 2 transmission parameters based upon switching to a different RB set and/or resource pool, for example, after the detection of an LBT failure or a CSLF or after a backoff period applied after the detection of the LBT failure. Tx parameters may include at least one of the following: a tx periodicity, a tx offset, a sensing window, a selection window size, a number of resources (e.g., the number of reserved resources), and/or the resource occupation window size. The WTRU may be configured with a subset of tx parameters to use, for example, per RB set or resource pool. The WTRU may change one or more of the tx parameters herein after a configured number of LBT failures. For example, the WTRU may determine which parameter set to use based on the number of counted LBT failures (e.g., based on the value of the LBT failure counter).

After one or more LBT failures, the WTRU may determine whether to trigger a resource reselection, based on the periodicity of the selected resources (e.g., when the selected resources are periodic). The WTRU may release occupied mode 2 resource(s) following an LBT failure. Following the LBT failure of a transmission of a discovery message, the WTRU may change the tx parameters associated with the transmission or retransmission.

A WTRU may maintain multiple LBT procedures on different resource sets (e.g., maintain multiple CSLF processes simultaneously). When selecting a resource set following a CSLF, the WTRU may select the resource set based on the CSLF status (e.g., the CSLF status on each of the resource sets). For example, following a CSLF on a first resource set, the WTRU may select a second resource set. The second resource set may be a resource set on which an LBT procedure performed results in the least number of LBT failures (e.g., the smallest CSLF counter or a zero value for the CSLF counter) among the resource sets.

A WTRU may refrain from selecting a resource set (e.g., exclude the resource set from the selection) for a period of time after a CSLF is declared on that resource set.

A WTRU (e.g., a peer WTRU) may blind decode on data and/or SCI resources associated with a subset of RB sets (or resource pools) in an active BWP. The peer WTRU may provide an indication (e.g., a channel sensing indication) to a tx WTRU (e.g., in an PSFCH, SCI or MAC CE) indicating which of the monitored RB sets are sensed to be idle or occupied (e.g., if the current RB set on which the SCI or PSFCH is exchanged is idle). For example, the peer WTRU may provide channel sensing results for monitored RB sets within a resource pool or a configured subset of RB sets in a BWP (e.g., the active BWP). The peer WTRU may provide a channel sensing indication to the tx WTRU periodically or aperiodically (e.g., the periodicity or otherwise may be configured by RRC signaling). In an example, the peer WTRU may provide a channel sensing indication to the tx WTRU on occasion(s) preceding or coinciding with expected periodic data transfer between the WTRUs (e.g., the peer WTRU and the tx WTRU herein) and/or along with channel measurements and/or SSB transmissions. The SCI from peer WTRU may include a channel sensing status and/or may be sent based on one or more of the following: in some conditions (e.g., if expected traffic is not received); if the peer WTRU has one or more of data, control information, SSBs/RS, or measurements to send along with; and/or if the peer WTRU is configured to send a clear to send (CTS) notification (e.g., periodically).

In one example, a rx WTRU may sense a number of RB sets that are clear and send them (e.g., the indications of the RB sets that are sensed to be clear), for example, as part of the SCI, a MAC CE, or part of the PSFCH. The RX WTRU may then blind decode on those RB sets for SL data reception. A tx WTRU may select an RB set to switch to (e.g., following an LBT failure) from the ones indicated in the SCI, for example, as the RX WTRU senses those as Idle at least. The tx WTRU may perform LBT operation(s) on all or a subset of the indicated RB sets and transmit the TB on RB set(s) (e.g., a single RB set) that succeeded an LBT operation. The tx WTRU may transmit, for example, if (e.g., only if) an LBT operation was successful in LBT bandwidths (e.g., in the RB set) over which the LBT operation was performed.

The WTRU may switch the resource pool monitored (e.g., in mode 2) and/or the RB set monitored for reception of data and/or control information from a peer WTRU after the detection of one or more LBT failure(s) (e.g., dependent on the value of an LBT counter) and/or after the detection of CSLF. The WTRU may determine which Rx RB set and/or which Rx resource pool to monitor/switch to based on the LBT failure determined by the PHY at the WTRU (e.g. based on one or more of an LBT type, an LBT configuration, and/or the RB set on which an LBT attempt has failed) and/or based on the value(s) of the CSLF process parameters (e.g., an LBT counter or timer). The WTRU may switch the resource pool monitored (e.g., in mode 2) and/or the RB set monitored based on the measured RSSI or channel occupancy (e.g., with a measurement being greater than a configured threshold).

Similar to the Tx RB set switching, the WTRU may be configured with a pattern or configuration to determine which Rx RB set to switch to. The TX and RX RB sets may be linked. The WTRU may switch to an Rx resource pool, e.g., using a sequency number (e.g., if LBT is failed on RB set index y, the WTRU would switch to RB set of index y+1). The WTRU may couple Tx and Rx resource switching times, such that both Tx and Rx pools are switched together at the same time. For example, the WTRU may switch its monitored Rx RB set following the expiry of the RB set inactivity timer.

A WTRU may be configured with a switching pattern (e.g., a RB set switching pattern), whereby the WTRU (e.g., a tx WTRU) may switch to another RB set following one or more LBT failure(s), and the RB set the WTRU switches to may be based on the configured switching pattern. The switching pattern may be selected by the WTRU or may include some or all RB sets in a BWP (e.g., the active BWP).

In one example, the WTRU may determine which RB set and/or resource pool to switch to based on the RB set on which an LBT failure has been detected (e.g., a consistent LBT failure has been detected) and/or based on the LBT failure indication(s) determined by the PHY of the WTRU.

In examples, following one or more LBT failure to transmit a discovery message or signal on a dedicated discovery pool, the WTRU may switch to a different resource pool or RB set (e.g., a shared resource pool) for the transmission or retransmission of the discovery message. This may be conditioned on the number of LBT failures (e.g., the value of the LBT counter). The WTRU may start monitoring a shared resource pool for the reception of discovery messages from other WTRUs upon determining that the channel is occupied on the dedicated discovery pool (e.g., from an LBT failure indication received for the dedicated resource pool and from a channel sensing that the unlicensed channel on the applicable RB set is occupied, and/or from the measured RSSI value or channel occupancy (e.g., with a measurement being above a configured threshold).

A peer WTRU may access a channel to transmit HARQ feedback or SCI (e.g., despite or amid an LBT failure). A WTRU may include one or more of an SCI, HARQ feedback (e.g., PSFCH), or a MAC CE, along with SL data transmissions indicating which RB set(s) are sensed to be idle (e.g., RB set(s) within a resource pool). A peer WTRU may fail an LBT operation in an attempt to transmit HARQ feedback and/or other SCI (e.g., due to a hidden node affecting the rx WTRU only). The peer WTRU may switch to another RB set from monitored RB sets to transmit one or more of the HARQ feedback, PSFCH, or SCI, in response to the received SL data. The monitored RB sets may be configured or predetermined, for example, as RB sets within a selected resource pool.

A peer WTRU may transmit HARQ feedback (e.g., on PSFCH) in response to received SL data, transmit an acknowledgement, or transmit an SCI after the reception of the MAC CE or SCI transmitted by a tx WTRU (e.g., a successful reception). The peer WTRU may transmit one or more of the HARQ feedback, the acknowledgement, or the SCI, on the RB set that is indicated by the tx WTRU as idle. The tx WTRU may retransmit the TB that was unacknowledged (or the TB that failed LBT operation(s) or transmit a TB (e.g., a new TB) on the different/indicated RB set or resource pool after receiving feedback, acknowledgment, or an SCI from the peer WTRU, in response to the RB set switch. The tx WTRU may transmit the RB set switch MAC CE or SCI, for example, according to one or more of the following: after the expiry of a timer (e.g., a HARQ retransmission timer); after a number of retransmissions; after a number of NACKs; and/or after a number of LBT failures (e.g., as a function of the CSLF counter). The tx WTRU may retransmit a TB, following the expiry of a retransmission timer (e.g., only following the expiry of a retransmission timer), and/or after the reception of an SCI from the rx WTRU indicating one or more of the chosen RB set was occupied, an alternative idle RB set, a NACK, and/or an RB set switch (e.g., only after the reception of an SCI from the rx WTRU indicating one or more of the chosen RB set was occupied, an alternative idle RB set, a NACK, and/or an RB set switch).

A WTRU may exclude resource(s) associated with a triggered CSLF. For example, a WTRU may exclude a set of resources (e.g., a carrier, a BWP, a periodic resource reservation, a resource pool, a subset of resources associated with LBT, etc) for selection and/or transmission following a CSLF, an LBT failure, or a number of LBT failures, which may occur on that set of resources. A WTRU may (e.g., in response) exclude such set of resources, e.g., for a period of time. Such period of time may be configured or preconfigured. A WTRU may be configured or preconfigured with a different period of time associated with one or a combination of more than one of the following: a LBT type performed that resulted in a CSLF; a number of (e.g., currently available) resources sets (e.g., a number of carriers); SL measurement(s) associated with the set of resources, which may be performed when a CSLF was triggered; a CBR value on the set of resources; or priority of data for transmission at the WTRU. A WTRU may exclude a set of resources by performing one of the following actions, or combination of more than one of the following actions: excluding the resources as possible available resources in resource selection; excluding the resources from the set of available resources determined by sensing; stopping performing sensing on the resources; excluding a carrier from the carriers that may be used for carrier (re) selection, and/or for performing (re) selection of resources that have been reserved (or carriers that have been selected) for future transmissions and/or resources that were reserved/selected prior to a CSLF; or flushing the SL HARQ buffer, which may be associated with a SL process for the affected SL resources.

In response to one or more of the actions described herein to exclude a set of resources, a WTRU may exclude using the resources in future resource selection decisions, wherein such exclusion may be performed for a period of time following the CSLF. For example, in response to detection of a CSLF on a given SL resource set, the WTRU may start a prohibit timer (e.g., a CSLF declared timer or the RB set inactivity timer). The WTRU may maintain such timer per LBT bandwidth, BWP, SL carrier, and/or resource set. The WTRU may maintain such timer per type of transmission (e.g., cast type, transmission to a specific L2 ID, QoS/priority, SL PHY channel, etc.). During a time duration that the time is running, the WTRU may not select data and/or control resources if a CSLF was detected on an associated LBT bandwidth, BWP, and/or carrier. In response to expiry of the prohibit timer, the WTRU may consider SL data and/or control resource(s) on the associated LBT bandwidth, BWP, and/or carrier, e.g., for retransmission of the data or control information that failed LBT.

A WTRU may reconsider (e.g., prematurely, which may be prior to the completion of a time duration of a timer) the excluded resources, e.g., based on an occurrence of a specific event. For example, the WTRU may cancel or stop the prohibit timer described herein in response to an occurrence of an event. Such event may be associated with a reception of a SL control and/or data transmission (e.g., from another WTRU), which may be associated with resources. Such event may include a reception of an indication (e.g., an explicit or implicit indication, such as a scheduling DCI scheduling a SL transmission or reception of an SCI from another WTRU). Such event may include the WTRU determining that a measurement (e.g., CBR, RSSI, etc.) associated with affected resources meets a specific condition (e.g., RSSI below a threshold, e.g., for a period of time).

Data and control forwarding may be implemented. In response to a detection of a CSLF, a WTRU may forward the TB and/or SCI that failed an LBT procedure to a base station or to a third WTRU connected to a peer WTRU. The WTRU may perform such forwarding if (e.g., only if) the TB and/or SCI were/was not previously transmitted to the destination WTRU. The WTRU may include the destination cast ID and the forwarded data and/or SCI. In the case of data forwarded to a base station, the WTRU may transmit the data on a PUSCH grant. In the case of forwarded SCI, the WTRU may transmit the forwarded SCI on a PUCCH transmission or as UCI on a PUSCH transmission and/or may include a destination peer ID. In the case of data or control forwarded to a third WTRU, the WTRU may forward the data or SCI to the third WTRU on a SL-SCH resource and/or a SL control resource. The forwarded SCI may include a notification of a CSLF detection and the cast ID, e.g., which may be in addition to the SCI that failed the LBT procedure.

The third WTRU (e.g., a relay WTRU) may provide feedback to a transmitting WTRU that the destination WTRU is reachable (e.g., an LBT procedure is successful towards the destination WTRU) and/or that a confirmation that the data is forwarded. In response to forwarding data and/or control information to the base station, the WTRU may monitor a PDCCH transmission for a confirmation that the data and/or control have/has been forwarded to the WTRU (e.g., successfully). The confirmation may be in a form of a HARQ-ACK signaling.

Reporting to upper layer(s) may be implemented. A WTRU may release a unicast link, e.g., in response to detecting an UL LBT failure on active (e.g., all active) SL carrier(s), active (e.g., all active) SL resource sets, and/or active (e.g., all active) BWPs. The WTRU may notify or report to upper layer(s) (e.g., declaring an RLF) in response to one or more of the following: a number of consecutive detected CSLFs, a number of consecutive carrier or resource switches performed after a detection of a CSLF, or detecting a CSLF on SL resources (e.g., all SL resources) used by a MAC entity (e.g., all SL carriers, SL resources on all LBT bandwidths, and/or all SL BWPs)

Uu and SL may be implemented on a same unlicensed carrier. If a same unlicensed carrier is configured or used by an Uu link and the SL operation for a same WTRU, the WTRU may perform recovery actions described herein for both the Uu and SL MAC entities, e.g., in response to a detection of a CSLF on the Uu, SL, or the Uu and SL. For example, in response to detection of a CSLF on a SL MAC entity, the WTRU may switch to a different BWP on the Uu link associated with a same carrier and/or BWP and/or may initiate a random-access procedure (e.g., new random-access procedure) on the Uu for recovery.

If a same unlicensed carrier is configured or used by the Uu link and the SL operation for a same WTRU, the WTRU may use a slot configured for the SL operation for (e.g., instead for) Uu, e.g., in response to a number of configured or predefined LBT failures on the SL. The WTRU may report a failure on Uu-UL slots and/or may forward the data or SCI that failed an LBT procedure.

Systems, methods, and instrumentalities are disclosed herein for handling consistent sidelink (SL) listen-before-talk (LBT) failures (CSLF). A wireless transmit/receive unit (WTRU) may perform a listen before talk (LBT) procedure associated with a sidelink (SL) bandwidth. The SL bandwidth may include a resource block (RB) set. The WTRU may determine a CSLF associated with the RB set of the SL bandwidth based on the LBT procedure. The WTRU may determine a resource for reporting the CSLF, for example, based on a priority rule. The priority rule may indicate that a licensed resource has a higher priority than an unlicensed resource. The priority rule may indicate that, if a consistent LBT failure is not detected on an unlicensed uplink (UL) resource, the unlicensed UL resource has a higher priority than an unlicensed SL resource. The WTRU may send a medium access control (MAC) control element (CE) using the determined resource. In examples, the MAC CE may indicate the RB set and/or an identification of a WTRU associated with the SL bandwidth.

The priority rule may indicate that if a CSLF is not detected on a first unlicensed SL resource, and a CSLF is detected on a second unlicensed SL resource, the first unlicensed SL resource has a higher priority than the second unlicensed SL resource. The priority rule may indicate that, if a consistent LBT failure is detected on an unlicensed UL resource, and a CSLF is not detected on a unlicensed SL resource, the unlicensed UL resource has a lower priority for CSLF reporting than the unlicensed SL resource.

A WTRU may switch from a first RB set to a second RB set based on a determination of one or more LBT failures on the first RB set. The WTRU may detect a CSLF on the first RB set, for example, by performing a first LBT procedure including at least one LBT attempt for a transmission of a TB. The WTRU may determine the second RB set based on the detection of the CSLF associated with the first RB set. In examples, the WTRU may perform a second LBT procedure associated with the second RB set. The WTRU may determine that the second LBT procedure is successful or that a number of LBT failures associated with the second RB set is less than a value. The WTRU may determine the TB associated with the first RB set and transmit the TB using the second RB set. In some examples, the WTRU may transmit the TB associated with the first RB using the second RB set based on SL control information (SCI) associated with the second RB set being received from another WTRU associated with the second RB set. The first RB set and the second RB set may be associated with a same data resource pool or associated with different data resource pools.

A WTRU may determine a CSLF associated with an RB set (e.g., the first RB set) based on a number of SL LBT failures associated with the RB set, for example, when the number of SL LBT failures associated with the RB set is equal to or greater than a value. For example, the WTRU may increment the number of SL LBT failures associated with the RB set if the WTRU determines that SCI has not been received, within a time, from another WTRU associated with the RB set. The WTRU may increment the number of SL LBT failures associated with the RB set if the WTRU determines that a channel busy ratio (CBR) associated with the RB set is equal to or greater than a value. In examples, an LBT procedure may include a determination of whether the SCI is received from another WTRU associated with the RB set or a determination of the CBR associated with the RB set. The WTRU may increment the number of SL LBT failures associated with the RB set based on a LBT procedure.

A WTRU may indicate an SL LBT failure to a base station. The WTRU may perform an LBT procedure including one or more LBT attempts. The WTRU may determine that an LBT attempt on an RB set has been unsuccessful. The WTRU may determine an SL LBT failure associated with the RB set based on the unsuccessful LBT attempt on the RB set. The WTRU may send an indication of the SL LBT failure to the base station, for example, using an MAC CE or using a negative acknowledgement for a physical uplink control channel (PUCCH) transmission from the base station.

A WTRU may perform multiple LBT attempts on respective RB sets of configured RB sets. The WTRU may receive configuration information indicating multiple RB sets. The WTRU may perform a respective LBT attempt on an RB set of the configured RB sets. The WTRU may determine an LBT attempt on an RB set of the configured RB sets is successful. The WTRU may transmit a TB using the RB set associated with the successful LBT attempt.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well. For example, while the system has been described with reference to a 3GPP, 5G, and/or NR network layer, the envisioned embodiments extend beyond implementations using a particular network layer technology. Likewise, the potential implementations extend to all types of service layer architectures, systems, and embodiments. The techniques described herein may be applied independently and/or used in combination with other resource configuration techniques.

The processes described herein may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read-only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

It is understood that the entities performing the processes described herein may be logical entities that may be implemented in the form of software (e.g., computer-executable instructions) stored in a memory of, and executing on a processor of, a mobile device, network node or computer system. That is, the processes may be implemented in the form of software (e.g., computer-executable instructions) stored in a memory of a mobile device and/or network node, such as the node or computer system, which computer-executable instructions, when executed by a processor of the node, perform the processes discussed. It is also understood that any transmitting and receiving processes illustrated in figures may be performed by communication circuitry of the node under control of the processor of the node and the computer-executable instructions (e.g., software) that it executes.

The various techniques described herein may be implemented in connection with hardware or software or, where appropriate, with a combination of both. Thus, the implementations and apparatus of the subject matter described herein, or certain aspects or portions thereof, may take the form of program code (e.g., instructions) embodied in tangible media including any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable devices, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object-oriented programming language to communicate with a computer system. However, the program(s) can be implemented in assembly or machine language, if desired. In any case, the language may be a compiled or interpreted language and combined with hardware implementations.

Although example embodiments may refer to utilizing aspects of the subject matter described herein in the context of one or more stand-alone computing systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

In describing the preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

What is claimed:

1. A wireless transmit/receive unit (WTRU), comprising:
a processor configured to:
receive configuration information associated with a sidelink (SL) listen before talk (LBT) procedure, wherein the configuration information indicates a time period and a maximum counter value;
perform, based on the configuration information, the SL LBT procedure;
determine to trigger a consistent SL LBT failure (CSLF) associated with a set of resources of a resource pool, wherein the determination to trigger the CSLF is based on the SL LBT procedure, and wherein a number of LBT failures associated with the set of resources of the resource pool reaches the maximum counter value;
based on the determination to trigger the CSLF, start a timer, wherein the timer is associated with the time period:
during the time period that the timer is running, select a first resource for a first SL transmission, wherein the first resource is selected from the resource pool excluding the set of resources associated with the CSLF;
trigger a CSLF medium access control (MAC) control element (CE);
send the CSLF MAC CE; and
after the timer expires, cancel the CSLF associated with the set of resources.

2. The WTRU of claim 1, wherein the CSLF MAC CE is sent via the first SL transmission.

3. The WTRU of claim 1, wherein the processor is further configured to select a second resource for a second SL transmission from a plurality of resources that includes the set of resources.

4. The WTRU of claim 3, wherein the processor is further configured to:
send the first SL transmission using the first resource; and
send the second SL transmission using the second resource.

5. The WTRU of claim 1, wherein the CSLF MAC CE indicates the CSLF associated with the set of resources, and wherein the processor is further configured to:
receive an uplink (UL) grant; and
send the CSLF MAC CE according to the UL grant.

6. The WTRU of claim 1, wherein the processor is further configured to:
determine a bandwidth part (BWP) for the first SL transmission, wherein the BWP comprises the resource pool from which the first resource is selected for the first SL transmission.

7. The WTRU of claim 1, wherein the processor is further configured to operate according to an SL resource allocation mode 2, and wherein the processor is further configured to:
determine that an LBT failure occurs on the set of resources;
increment a counter value for the set of resources by one;
determine that the number of LBT failures is equal to or greater than the maximum counter value; and
send the CSLF MAC CE indicating the CSLF associated with the set of resources.

8. The WTRU of claim 1, wherein the start of the timer indicates a start of a CSLF report and recovery procedure configured for the WTRU.

9. The WTRU of claim 1, wherein the configuration information indicates one or more resource pools for the SL LBT procedure, wherein the resource pool is a first resource pool of the one or more resource pools, and a second resource pool of the one or more resource pools includes the set of resources, and where the processor is further configured to use the first resource pool for the selection of the first resource for the first SL transmission during the time period and, after the expiration of the timer, switch to the second resource pool for a selection of a second resource for a second SL transmission.

10. The WTRU of claim 9, wherein the first resource and the second resource are the same.

11. The WTRU of claim 9, wherein the first resource and the second resource are different.

12. The WTRU of claim 1, wherein the set of resources comprises a resource block (RB) set.

13. A method performed by a wireless transmit/receive unit (WTRU), comprising:
receiving configuration information associated with a sidelink (SL) listen before talk (LBT) procedure, wherein the configuration information indicates a time period and a maximum counter value;
performing, based on the configuration information, the SL LBT procedure;
determining to trigger a consistent SL LBT failure (CSLF) associated with a set of resources of a resource pool, wherein the determination to trigger the CSLF is based on the SL LBT procedure, and wherein a number of LBT failures associated with the set of resources of the resource pool reaches the maximum counter value;
based on the determination to trigger the CSLF, starting a timer, wherein the timer is associated with the time period:
during the time period that the timer is running, selecting a first resource for a first SL transmission, wherein the first resource is selected from the resource pool excluding the set of resources associated with the CSLF;
triggering a CSLF medium access control (MAC) control element (CE);
sending the CSLF MAC CE; and
after the timer expires, cancelling the CSLF associated with the set of resources.

14. The method of claim 13, wherein the CSLF MAC CE is sent via the first SL transmission.

15. The method of claim 13, further comprising selecting a second resource for a second SL transmission from a plurality of resources that includes the set of resources.

16. The method of claim 13, wherein the CSLF MAC CE indicates the CSLF associated with the set of resources, and wherein the method further comprises:
receiving an uplink (UL) grant; and
sending the CSLF MAC CE according to the UL grant.

17. The method of claim 13, wherein the method further comprises:
determining a bandwidth part (BWP) for the first SL transmission, wherein the BWP comprises the resource pool from which the first resource is selected for the first SL transmission.

18. The method of claim 13, wherein the method further comprises:
determining that an LBT failure occurs on the set of resources;
incrementing a counter value for the set of resources by one;
determining that the number of LBT failures is equal to or greater than the maximum counter value; and
sending the CSLF MAC CE indicating the CSLF associated with the set of resources.

19. The method of claim 13, wherein a start of the time period indicates the start of a CSLF report and recovery procedure configured for the WTRU.

20. The method of claim 13, wherein the configuration information indicates one or more resource pools for the SL LBT procedure, wherein the resource pool is a first resource pool of the one or more resource pools, and a second resource pool of the one or more resource pools includes the set of resources, and where the method further comprises using the first resource pool for the selection of the first resource for the first SL transmission during the time period and, after the expiration of the timer, switching to the second resource pool for a selection of a second resource for a second SL transmission.

* * * * *